US012779824B2

(12) United States Patent
Morita et al.

(10) Patent No.: US 12,779,824 B2
(45) Date of Patent: Nov. 3, 2026

(54) METHOD FOR PRODUCING LAMINATED GLASS FOR AUTOMOBILE WINDOWS, LAMINATED GLASS FOR AUTOMOBILE WINDOWS, AND AUTOMOBILE

(71) Applicant: AGC Inc., Tokyo (JP)

(72) Inventors: Yoshinobu Morita, Tokyo (JP); Kuniko Nagai, Tokyo (JP)

(73) Assignee: AGC INC., Tokyo (JP)

( * ) Notice: Subject to any disclaimer, the term of this patent is extended or adjusted under 35 U.S.C. 154(b) by 291 days.

(21) Appl. No.: 18/380,533

(22) Filed: Oct. 16, 2023

(65) Prior Publication Data

US 2024/0042739 A1 Feb. 8, 2024

Related U.S. Application Data

(63) Continuation of application No. PCT/JP2022/017963, filed on Apr. 15, 2022.

(30) Foreign Application Priority Data

Apr. 20, 2021 (JP) ................................ 2021-071142
Apr. 20, 2021 (JP) ................................ 2021-071143

(51) Int. Cl.

| | |
|---|---|
| ***B32B 17/10*** | (2006.01) |
| ***B32B 1/00*** | (2024.01) |
| ***B32B 7/022*** | (2019.01) |
| ***B60J 1/00*** | (2006.01) |

(Continued)

(52) U.S. Cl.

CPC .......... *B32B 17/10981* (2013.01); *B32B 1/00* (2013.01); *B32B 7/022* (2019.01);

(Continued)

(58) Field of Classification Search

CPC ...................................... B32B 17/00–17/1099

See application file for complete search history.

(56) References Cited

U.S. PATENT DOCUMENTS 3,708,386 A 1/1973 Alexander et al.
2006/0138798 A1* 6/2006 Oehrlein .......... B32B 17/10036 296/84.1

FOREIGN PATENT DOCUMENTS

JP 2012-179680 A 9/2012
JP 2013-040086 A 2/2013

(Continued)

OTHER PUBLICATIONS

International Searching Authority, "International Search Report," issued in connection with International Patent Application No. PCT/JP2022/017963, dated Jun. 21, 2022.

(Continued)

*Primary Examiner* — Prashant J Khatri
(74) *Attorney, Agent, or Firm* — Foley & Lardner LLP

(57) ABSTRACT

A method for producing laminated glass for automobile windows includes:

heating and bend forming two glass plates; and bonding together the two bend-formed glass plates via an interlayer film, wherein before the heating and bend forming of the two glass plates, at least one glass plate of the two glass plates that are flat, is conveyed by a conveying unit while either a conveying unit-facing surface of the at least one glass plate or a non-facing surface of the at least one glass plate that is opposite to the conveying unit-facing surface is scratched by the conveying unit, and in the bonding together of the two bend-formed glass plates via the interlayer film, the scratched surface is disposed such that the scratched surface is situated on a vehicle-interior side upon the laminated glass for automobile windows being attached to an automobile.

5 Claims, 14 Drawing Sheets

(51) Int. Cl.

| | |
|---|---|
| ***B60J 1/02*** | (2006.01) |
| ***C03B 23/023*** | (2006.01) |
| ***C03C 19/00*** | (2006.01) |
| ***C03C 27/10*** | (2006.01) |

(52) U.S. Cl.

CPC .. *B32B 17/10036* (2013.01); *B32B 17/10761* (2013.01); *B32B 17/10935* (2013.01); *B32B 17/1099* (2013.01); *B60J 1/001* (2013.01); *B60J 1/02* (2013.01); *C03B 23/023* (2013.01); *C03C 19/00* (2013.01); *C03C 27/10* (2013.01); *B32B 2307/54* (2013.01); *B32B 2605/08* (2013.01)

(56) References Cited

FOREIGN PATENT DOCUMENTS

| | | | | |
|---|---|---|---|---|
| JP | 5637147 B2 | | 12/2014 | |
| JP | 2015-000821 A | | 1/2015 | |
| JP | 6065221 B2 | | 1/2017 | |
| JP | 2017-213928 A | | 12/2017 | |
| WO | WO-2011/074615 A1 | | 6/2011 | |
| WO | WO-2019038720 A1 | * | 2/2019 | ....... B32B 17/10045 |
| WO | WO-2019/245819 A1 | | 12/2019 | |
| WO | WO-2020005554 A1 | * | 1/2020 | ....... B32B 17/10761 |

OTHER PUBLICATIONS

International Searching Authority, "Written Opinion," issued in connection with International Patent Application No. PCT/JP2022/017963, dated Jun. 21, 2022.

Pisano et al., "A micromechanical derivation of the macroscopic strength statistics for pristine or corroded/abraded float glass", Journal of the European Ceramic Society, vol. 37, No. 13, May 11, 2017, pp. 4197-4206.

* cited by examiner

METHOD FOR PRODUCING LAMINATED GLASS FOR AUTOMOBILE WINDOWS, LAMINATED GLASS FOR AUTOMOBILE WINDOWS, AND AUTOMOBILE

CROSS-REFERENCE TO RELATED APPLICATION

The present application is a continuation application of International Application No. PCT/JP2022/017963, filed Apr. 15, 2022, which claims priority to Japanese Patent Application No. 2021-071142 filed Apr. 20, 2021 and to Japanese Patent Application No. 2021-071143 filed Apr. 20, 2021. The contents of these applications are incorporated herein by reference in their entirety.

BACKGROUND OF THE INVENTION

1. Field of the Invention

The disclosures herein relate to a method for producing laminated glass for automobile windows, laminated glass for automobile windows, and an automobile.

2. Description of the Related Art

There is demand for an automobile to have safety performance not only from the standpoint of occupant protection but also from the standpoint of the bodily protection of a pedestrian at the time of collision with the pedestrian. In response to such a demand, for example, Unexamined Japanese Patent Application Publication No. 2017-213928 proposes a configuration in which when a downward impact is applied from the front to the surroundings of a cowl louver and a windshield glass in a case where a pedestrian is involved in a head-on collision with an automobile, the connected cowl louver and windshield glass become separated from each other, thereby ensuring bodily protection performance for the pedestrian.

According to recent accident research, it has been reported that when a rider (i.e., a cyclist) of a bicycle, a two-wheeled vehicle, or the like has a frontal collision with a vehicle, the position at which the body of the cyclist collides with the vehicle is higher than that of a pedestrian, that is, the position tends to be mainly the windshield (i.e., front glass). Further, even in the case of a pedestrian, the frequency at which the body of the pedestrian collides with the windshield is on the rise due to the structure of a recent automobiles having a short front nose. Therefore, there is demand for the window glass itself such as a windshield to have improved bodily protection performance for pedestrians and cyclists (Hereinafter, also referred to as pedestrians and the like) alike. Here, in order to improve the bodily protection performance of the laminated glass for automobile windows (Hereinafter, also referred to as automobile window laminated glass) such as a windshield, it is important to reduce the impact and damage to the body of a pedestrian or the like by having the glass plate break appropriately at the time of the collision, thereby enabling the glass plate itself to absorb the impact, and, in turn, further enabling an interlayer film interposed between the glass plates to also fulfill its functions with respect to impact absorption and penetration prevention.

It is known, however, that a glass plate originally has an in-plane strength distribution, and the strength of the glass plate is typically probabilistically specified by a safety factor, a breakage probability, or the like. As such, even in a case where the overall strength of the window glass is appropriate, a region with an excessively high strength (Hereinafter, also referred to as a high-strength region) may be localized in the plane of the window glass. When a pedestrian or the like collides with such a high-strength region, the window glass is unlikely to break. Consequently the window glass cannot absorb the impact and the interlayer film cannot fulfill its function, and thus the possibility of bodily damage being inflicted increases.

In order to lower the strength in the high-strength region as described above, it is conceivable to lower the overall strength of the glass for automobile windows by changing the composition of the glass or the production method thereof. However, in such a case, since the strength would decrease even in a region where the in-plane strength is relatively low, there is a possibility that the requisite toughness as automobile window glass cannot be ensured. Therefore, there is a demand for automobile window glass having high safety performance at the time of collision from the standpoint of protecting the body of, for example, a pedestrian as described above by reducing or eliminating a region having excessively high strength to make the in-plane strength distribution as uniform as possible.

An object of one aspect of the present disclosure is to provide laminated glass for automobile windows that has the requisite toughness as automobile window glass and has high bodily protection performance with respect to pedestrians or the like in the event of collision.

SUMMARY OF THE INVENTION

According to one aspect of the present disclosure, there is provided a method for producing laminated glass for automobile windows, the method including heating and bend forming two glass plates; and bonding together the two bend-formed glass plates via an interlayer film, wherein before the heating and bend forming of the two glass plates, at least one glass plate of the two glass plates that are flat, is conveyed by a conveying unit while either a conveying unit-facing surface of the at least one glass plate or a non-facing surface of the at least one glass plate that is opposite to the conveying unit-facing surface is scratched by the conveying unit, and in the bonding together of the two bend-formed glass plates via the interlayer film, the scratched surface is disposed such that the scratched surface is situated on a vehicle-interior side upon the laminated glass for automobile windows being attached to an automobile.

According to one aspect of the present disclosure, automobile window laminated glass having the requisite toughness as automobile window glass and having high bodily protection performance with respect to a pedestrian or the like at the time of collision can be obtained.

BRIEF DESCRIPTION OF THE DRAWINGS

FIG. 4 is a schematic diagram of an example of a conveying unit used in Embodiment a;

FIG. 13 is a graph illustrating the results of Experiment a;

DESCRIPTION OF THE PREFERRED EMBODIMENT

<Basic Structure of Laminated Glass>

Figure 1:
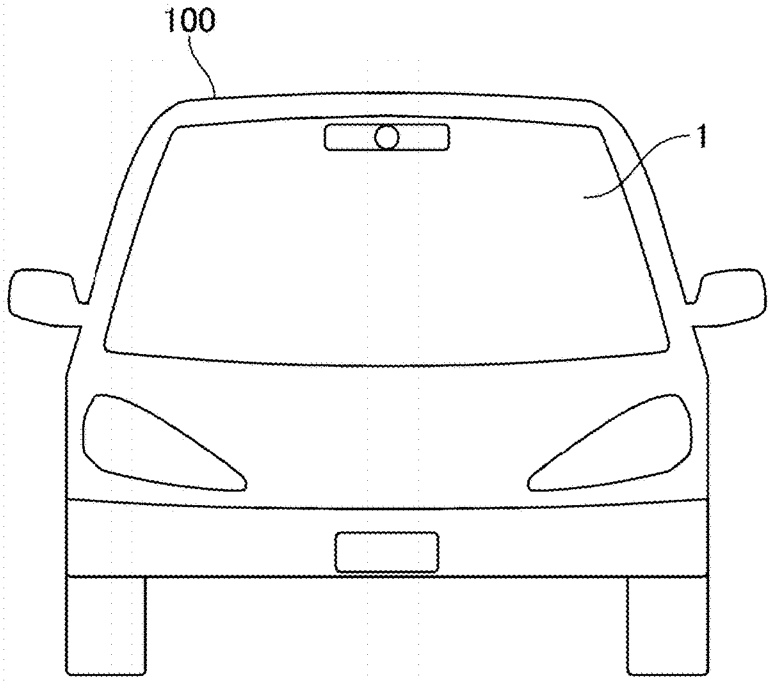
FIG. 1 is a front view of an automobile provided with laminated glass according to an embodiment of the present disclosure.

First, a basic structure of laminated glass for automobile windows is described. FIG. 1 illustrates an example in which laminated glass for automobile windows 1 (Hereinafter, also referred to as automobile window laminated glass 1) produced according to an embodiment of the present disclosure is used as window glass of an automobile 100. In the example of FIG. 1, although the automobile window laminated glass 1 is glass attached to an opening (window) in a front surface, i.e., windshield, of a vehicle body of the automobile 100, the automobile window laminated glass 1 according to the present embodiment can also be used as window glass other than the windshield, examples of which include, side glass, rear glass, and roof glass.

Figure 2:
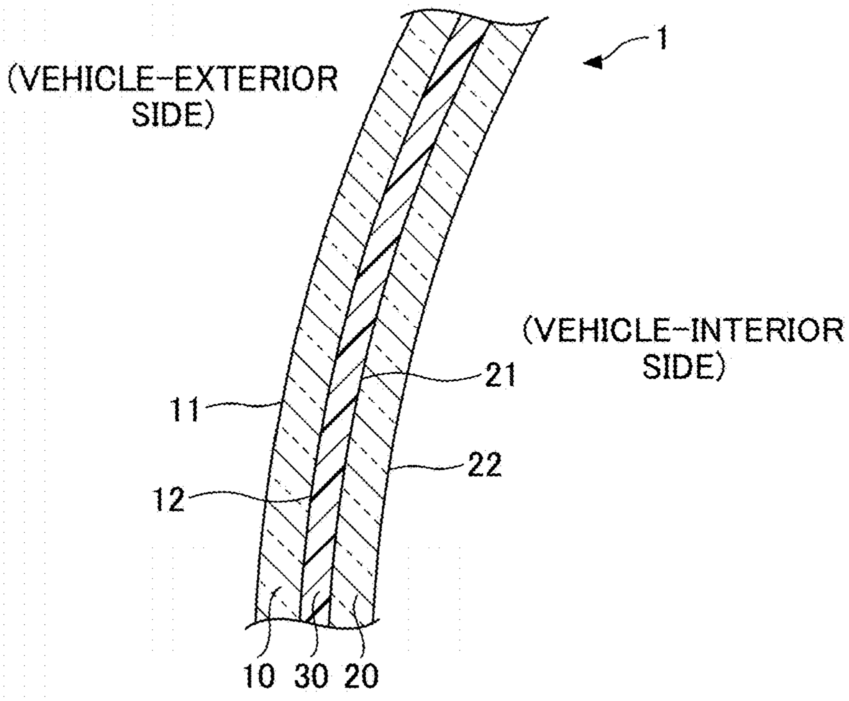
FIG. 2 is a cross-sectional view of the laminated glass illustrated in FIG. 1.

FIG. 2 illustrates a partial cross-sectional view of the automobile window laminated glass 1 illustrated in FIG. 1. As illustrated in FIG. 2, the automobile window laminated glass 1 may be obtained by bonding together a vehicle-exterior side glass plate 10 and a vehicle-interior side glass plate 20 via an interlayer film 30. As illustrated in FIG. 2, the vehicle-exterior side glass plate 10 has a first surface 11 that is a surface on the vehicle-exterior side and a second surface 12 that is a surface on the vehicle-interior side, and the vehicle-interior side glass plate 20 has a third surface 21 that is a surface on the vehicle-exterior side and a fourth surface 22 that is a surface on the vehicle-interior side.

The material constituting the vehicle-exterior side glass plate 10 and the vehicle-interior side glass plate 20 (Hereinafter, also collectively referred to as a glass plate for the sake of simplicity) in the laminated glass 1 is preferably inorganic glass. Examples of the inorganic glass include soda lime silicate glass, aluminosilicate glass, borate glass, lithium aluminosilicate glass, and borosilicate glass. Although the method for forming the glass plate made of inorganic glass is not particularly limited, the glass plate is preferably formed by, for example, a float method. Further, the glass plate may be non-tempered glass (float glass). The non-tempered glass is glass obtained by shaping molten glass into a plate shape and annealing the glass, yet is not subjected to tempering treatment such as air-cooling tempering treatment or chemical tempering treatment. By using the non-tempered glass, even in a case where the glass gets broken when an impact is sustained, the entire surface does not get finely crushed, and thus the field of view of an occupant can be ensured even in the event of an accident.

The thicknesses of the vehicle-exterior side glass plate 10 and the vehicle-interior side glass plate 20 may be the same or different from each other. The thickness of the vehicle-exterior side glass plate 10 may be 1.1 mm or more and 3.5 mm or less. The thickness of the vehicle-interior side glass plate 20 may be 0.5 mm or more and 2.3 mm or less. Further, the total thickness of the automobile window laminated glass 1 may be 2.3 mm or more and 8.0 mm or less. The configurations of the vehicle-exterior side glass plate 10 and the vehicle-interior side glass plate 20 (materials constituting the glass plates, methods of producing the glass plates, and the like) may also be the same or different from each other.

The material of the interlayer film 30 that is disposed between the vehicle-exterior side glass plate 10 and the vehicle-interior side glass plate 20 and bonds together the vehicle-exterior side glass plate 10 and the vehicle-interior side glass plate 20 is not particularly limited, but is preferably a thermoplastic resin. Examples of the material of the interlayer film 30 include thermoplastic resins conventionally used for the same purpose, such as plasticized polyvinyl acetal resins, plasticized polyvinyl chloride resins, saturated polyester resins, plasticized saturated polyester resins, polyurethane resins, plasticized polyurethane resins, ethylene-vinyl acetate copolymer resins, ethylene-ethyl acrylate copolymer resins, cycloolefin polymer resins, and ionomer resins. Further, resin compositions containing a modified hydrogenated block copolymer described in Japanese Patent No. 6065221 can also be suitably used. Among them, plasticized polyvinyl acetal resins are considered to be a suitable material because they have an excellent balance of various characteristics such as transparency, weather resistance, strength, adhesiveness, penetration resistance, impact energy absorption, moisture resistance, heat insulation, and sound insulation. The above thermoplastic resins may be used alone or two or more of these thermoplastic resins may be used in combination. "Plasticized" in the plasticized polyvinyl acetal resin means that the resin is plasticized by the addition of a plasticizer. The same applies to other plasticized resins.

The interlayer film 30 may be a resin not containing a plasticizer, for example, an ethylene-vinyl acetate copolymer resin. Examples of the above-described polyvinyl acetal resin include a polyvinyl formal resin obtained by reacting polyvinyl alcohol (PVA) with formaldehyde, a narrowly defined polyvinyl acetal resin obtained by reacting PVA with acetaldehyde, and a polyvinyl butyral resin (PVB) obtained by reacting PVA with n-butyraldehyde. In particular, PVB is considered to be a suitable material because it has an excellent balance of various characteristics such as transparency, weather resistance, strength, adhesiveness, penetration resistance, impact energy absorption, moisture resistance, heat insulation, and sound insulation. The above-mentioned resins may be used alone or two or more of these resins may be used in combination.

A peripheral edge of the automobile window laminated glass 1 may be provided with a shielding layer for protecting a sealant or the like that bonds and holds the automobile window laminated glass 1 to a vehicle body. The shielding layer can be formed by, for example, applying a ceramic color paste of a low-lightness color such as black, gray, or brown color containing a meltable glass frit containing a black pigment and firing the ceramic color paste. The shielding layer may be formed on the peripheral edge of the second surface 12, the third surface 21, the fourth surface 22 (FIG. 2), or any combination thereof of the automobile window laminated glass 1, preferably on the peripheral edge of one or both of the second surface 12 and the fourth surface 22. The shielding layer may be provided in an area from the peripheral edge end of the glass plate to a position 10 mm or more and 300 mm or less from the peripheral edge end of the glass plate.

As illustrated in FIG. 2, the automobile window laminated glass 1 may be entirely or partially curved so as to be convex on the vehicle-exterior side. In such a case, each of the vehicle-exterior side glass plate 10 and the vehicle-interior side glass plate 20 can be processed and curved to a desired predetermined curvature in one direction or two directions by a bend-forming step described further below.

<Method for Producing Laminated Glass for Automobile Windows>

Embodiment a

Figure 3:
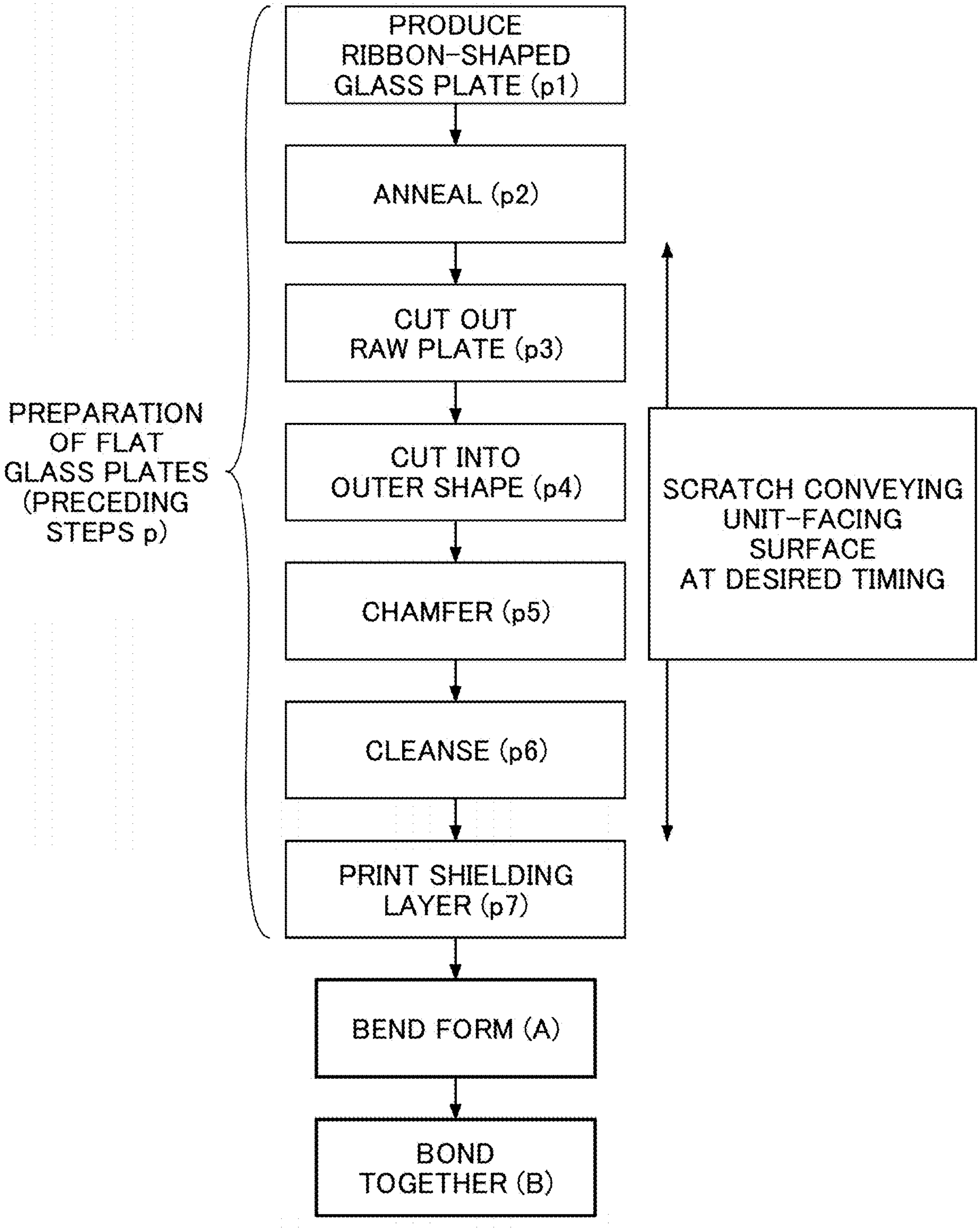
FIG. 3 is a flowchart illustrating an example of a method for producing laminated glass according to Embodiment a of the present disclosure.

A method for producing laminated glass for automobile windows according to Embodiment a which is one embodiment of the present disclosure is described. FIG. 3 is a flowchart illustrating an example of a method for producing laminated glass for automobile windows according to Embodiment a. As illustrated in FIG. 3, the producing method according to Embodiment a includes a step (A) of bend-forming flat glass plates and a step (B) of bonding together the two bend-formed glass plates. Also, the present production method includes steps (p) of preparing flat glass plates to be provided to the bend-forming step, as steps preceding the bend-forming step (A).

As illustrated in FIG. 3, the aforementioned flat glass plates preparing steps (p) may include producing a long ribbon-shaped glass plate by a float method, a roll-out method, or the like (p1), annealing the ribbon-shaped glass plate (p2), cutting out a raw plate from the ribbon-shaped glass plate (p3), cutting the raw plate into a desired outer shape (p4), chamfering (p5), cleansing (p6), and printing a shielding layer (p7). These steps p1 to p7 are examples, and the order of the individual steps p1 to p7 may be partially changed. In addition, some of these steps may be changed or omitted, or an additional step other than the steps p1 to p7 may be included at any timing of the steps p1 to p7. For example, one or more additional cleansing steps besides the cleansing step (p6) may be added at any timing between the end of the annealing step (p2) and the chamfering step (p5).

Conventionally, there has been demand for laminated glass for automobile windows to have various properties and functions related to safety, and the demand for such properties and functions is on the rise. In particular, nowadays, importance is being placed on not only the standpoint of occupant protection but also on the standpoint of bodily protection of a pedestrian or the like (a pedestrian, a cyclist, or the like) in a case where there is a collision with the pedestrian. Laminated glass for automobile windows is also required to satisfy specific standards such as the Head Injury Criterion (HIC) on the assumption that the laminated glass has appropriate toughness as an automobile window glass. For example, an HIC value of less than 1,000, preferably less than 650, may be required in a predetermined region of the laminated glass for automobile windows. Here, in order to improve the performance of protecting the body of a pedestrian or the like at the time of collision, it is important that a region where the strength is excessively high (high strength region) is reduced or eliminated in the laminated glass for automobile windows, and the distribution of the strength over the surface direction is suppressed (the strength distribution is narrow), that is, the in-plane strength is made uniform or equal as much as possible.

The method for producing laminated glass for automobile windows according to the present embodiment includes scratching the surface of the plate glass plate before the bend-forming step. In the present specification, "scratching" is a process of forming minute cracks (also referred to as microcracks, invisible minute cracks on the order of micrometers or less) on the surface of a glass plate. In this embodiment, the strength of the glass plate and the strength of the laminated glass obtained using the glass plate can be made uniform or equal in the plane direction by scratching the surface of the glass plate. Originally, minute cracks are present on the surface of the glass plate after production, and uneven distribution of the minute cracks is said to be a factor of the variation in strength of the glass for automobile windows. However, according to the production method of the present embodiment, it is considered that the strength of a region having excessively high strength (high-strength region) can be reduced by introducing additional minute cracks on the surface of the glass plate by performing scratching. Further, the scratching in the present embodiment is a process by which the strength of the region where the strength is relatively low (low-strength region) is not further reduced or is hardly reduced. Therefore, by performing the scratching process in the present embodiment, the in-plane strength of the glass plate or the obtained laminated glass can be made uniform, while still maintaining the requisite strength of the glass for automobile windows. As a result, automobile window laminated glass having a property that ensures the safety of a pedestrian or the like even in a case where the pedestrian or the like collides with the laminated glass, and also having the requisite toughness as glass for automobile windows, can be provided.

In the present embodiment, the scratching process is performed on a surface of at least one of the two flat glass plates to serve as the laminated glass, the surface being situated on the vehicle-interior side upon the attaching of the laminated glass to the automobile. For example, in a case where a pedestrian or the like collides with the windshield of the automobile from the vehicle-exterior side, the impact of the collision is sequentially transmitted from the first surface 11 of the vehicle-exterior side glass plate 10 which is the outermost surface to the fourth surface 22 of the vehicle-interior side glass plate 20 which is the innermost surface (FIG. 2). At this timing, in the vehicle-exterior side glass plate 10, a compressive stress corresponding to the compressive force at which an area is compressed is generated in the first surface 11, and a tensile stress corresponding to the tensile force at which an area is expanded is generated in the second surface 12. Therefore, in the vehicle-exterior side glass plate a crack is likely to start from the second surface 12 on the vehicle-interior side. Therefore, it is preferable that the second surface 12 readily breaks as intended at the time of collision. That is, it is preferable that there is no high-strength region or that there is only a small high-strength region, where the strength is locally excessively high in the second surface 12. Likewise, focusing on the vehicle-interior side glass plate 20, a compressive stress corresponding to a compressive force at which an area is compressed is generated in the third surface 21, and a tensile stress corresponding to a tensile force at which an area is expanded is generated in the fourth surface 22. Therefore, in the vehicle-interior side glass plate cracking is likely to start from the fourth surface 22 on the vehicle-interior side. Therefore, it is preferable that the fourth surface 22 readily breaks as intended at the time of collision. That is, it is preferable that there is no high-strength region or that there is only a small high-strength region, where the strength is locally excessively high in the fourth surface 22. Therefore, in the present embodiment, at least one of the second surface 12 on the vehicle-interior side of the vehicle-exterior side glass plate 10 or the fourth surface 22 on the vehicle-interior side of the vehicle-interior side glass plate 20 is subjected to a scratching process from the standpoint of protecting the body of a pedestrian or the like at the time of collision with the pedestrian. Further, if one of the second surface 12 and the fourth surface 22 is used, it is more preferable to apply the scratching process to the second surface 12 as this surface is more greatly affected by the impact at the time of collision, yet it is even more preferable to apply the scratching process to both the second surface 12 and the fourth surface 22.

The glass plate to be subjected to the scratching process in this embodiment is in a flat plate-shaped state prior to being bent. That is, the scratching process is performed not on the curved surface of the glass plate but rather on the flat surface of the glass plate. The scratching process is preferably performed along the entire surface of the glass plate in order to make the in-plane strength more uniform. However, in the case where the scratching process is performed uniformly on the curved surface of the glass body, it is necessary to change the direction in which the scratching units are opposed to each other or change the scratching unit itself in accordance with the curve of the curved surface, and consequently the process tends to become complicated. Further, in the present embodiment, the scratching process is performed on at least one of the second surface 12 or the fourth surface 22 as described above, that is, on the surface situated on the vehicle-interior side upon obtaining the laminated glass in the bonding step (B) that is performed after the scratching process, and the surface on the vehicle-interior side is a concave surface (FIG. 2). In a case where a concave surface undergoes this scratching process, it is more difficult to scratch the concave surface in accordance with the curve of the curved surface, and consequently configuration of the scratching unit is likely to be limited. Therefore, in the case where the concave surface is to be scratched, there is a possibility that a region left unscratched is formed and consequently a high-strength region remains, and conversely, there is a possibility that a deep scratch gets formed and consequently the strength is excessively lowered, and thus the requisite toughness is not obtained. In contrast to this, scratching of the flat surface of the glass plate is relatively easy because it is not necessary to consider the curvature of the surface, and thus the labor and cost for configuring the scratching unit(s) can be reduced.

In Embodiment a, the above-described scratching process can be performed by the conveying unit in the flat glass plate preparing step (p).

The conveying unit is a unit that moves a ribbon-shaped glass plate or glass plates in a predetermined direction thereby conveying the ribbon-shaped glass plate or the glass plates from one processing apparatus to the next processing apparatus in the flat glass plate preparing step (p). The conveying unit may be a continuous unit throughout the providing step (p) or may be a discontinuous unit. The conveying unit in this embodiment is preferably a conveying unit that supports and conveys the ribbon-shaped glass plate or the glass plates from below. Specific examples of the conveying unit include a roller conveyor and a belt conveyor. Among them, it is preferable that a roller conveyor is used in at least part of the production line of the flat glass plate preparing steps (p) because it is easy to control the conveying speed, for example. The roller conveyor can convey the glass plate at a speed of 0.01 m/s or more and 2 m/s or less.

Figure 4:
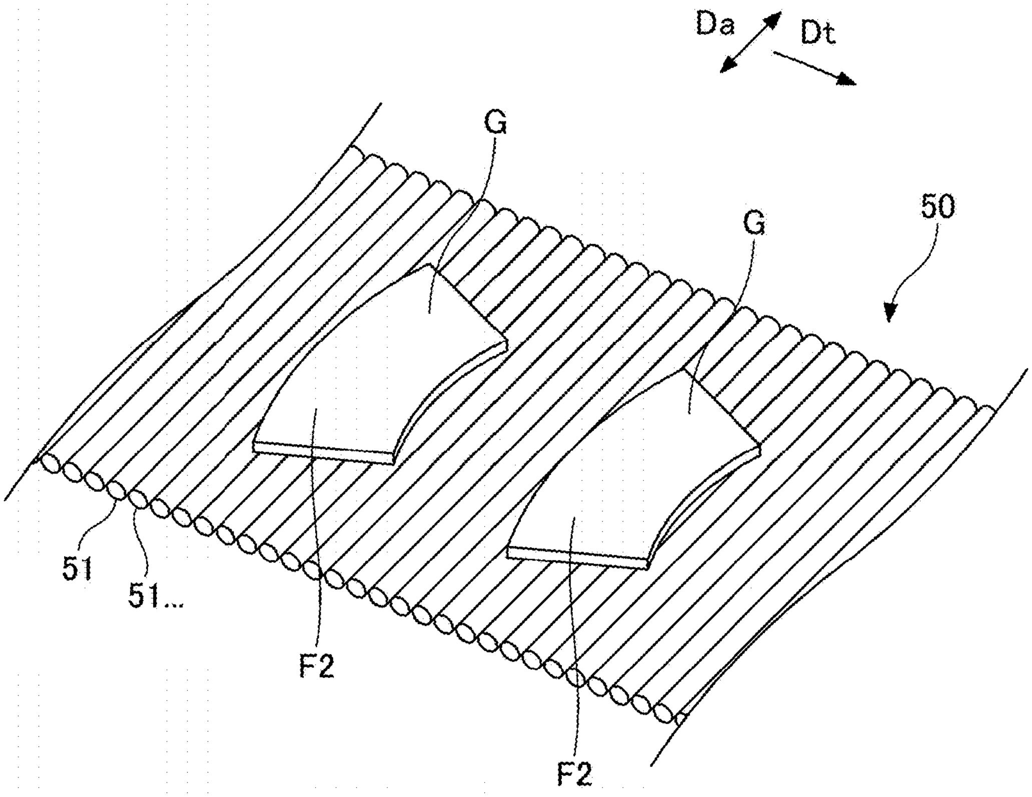

FIG. 4 schematically illustrates a roller conveyor 50 as an example of the conveying unit. As illustrated in FIG. 4, the roller conveyor 50 includes multiple conveying rollers 51, 51, and . . . each extending in a direction perpendicular to the conveying direction Dt and arranged parallel to one another in the conveying direction Dt. The flat glass plates G, G, and . . . are placed on these conveying rollers 51, 51, and . . . and are supported by the conveying rollers 51, 51, and . . . . At least some of the multiple conveying rollers 51, 51, and . . . are rotationally driven and the flat glass plates G, G, and . . . are conveyed in the conveying direction Dt by a frictional force generated by contact between the peripheral surfaces of the conveying rollers 51, 51, and . . . and the conveyance unit-facing surface of the glass plates G, G, and . . . facing the roller conveyor (conveying unit) 50. In this embodiment, at least some of the conveying rollers 51, 51, and . . . have a scratching function for the scratching process in addition to the conventional conveying function. In the example of FIG. 4, there is illustrated the conveying unit that conveys the glass plates G, G, and . . . after (after the outer shape cutting step p4) being cut into a shape for a windshield from the raw plate that was cut out in the cutting-out step (p3).

In the roller conveyor as the glass plate conveying unit, the radius of the conveying roller may be approximately 10 mm or more and 20 cm or less, depending on the sizes, thicknesses, and the like of the glass plates to be conveyed. It is preferable that the material of at least the surface of the conveying roller is made of a rubber-like material (a material having both high frictional resistance to glass and elasticity, such as rubber). For example, a sheet-shaped rubber-like member that is continuous in the axial direction Da of the conveying roller (the direction orthogonal to the conveying direction Dt in the roller conveyor of FIG. 4) may be wound around a shaft body formed of metal, resin, or the like, a belt-shaped or string-shaped rubber-like member may be spirally wound discontinuously in the axial direction Da, or a ring-shaped rubber-like body may be attached to the roller shaft portion with or without being spaced apart in the axial direction Da. In this way, the rubber-like member is disposed on the peripheral surface of the shaft body and is in contact with the glass plate, thereby playing a role in preventing the glass plate from slipping and preventing the strength of the glass plate from becoming compromised as window glass. Alternatively, the entirety of the conveying roller may be made of a rubber material.

Figure 5:
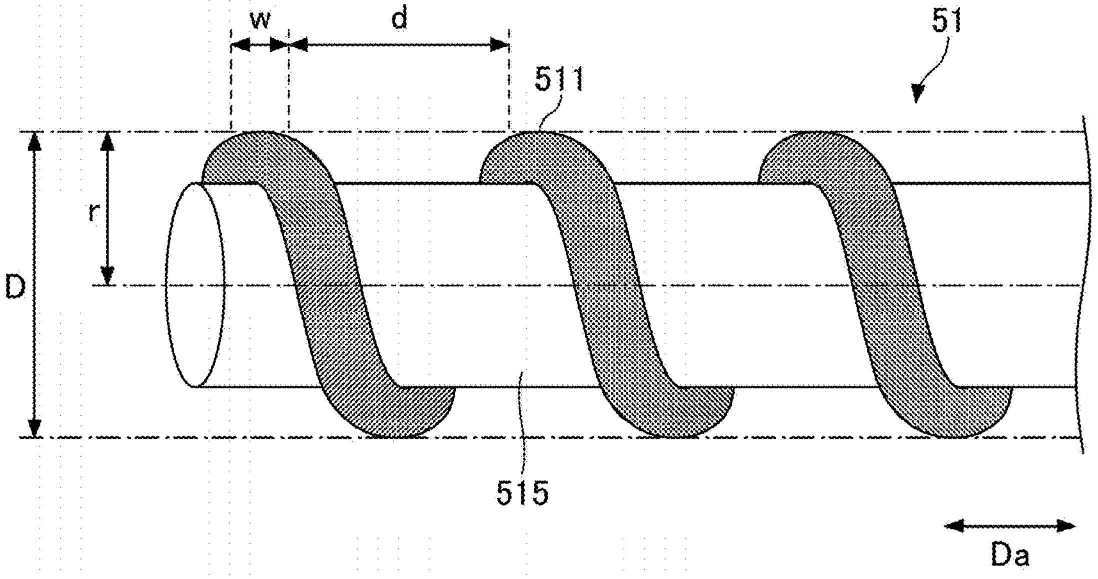
FIG. 5 is a diagram illustrating an example of a conveying roller.
Figure 6:
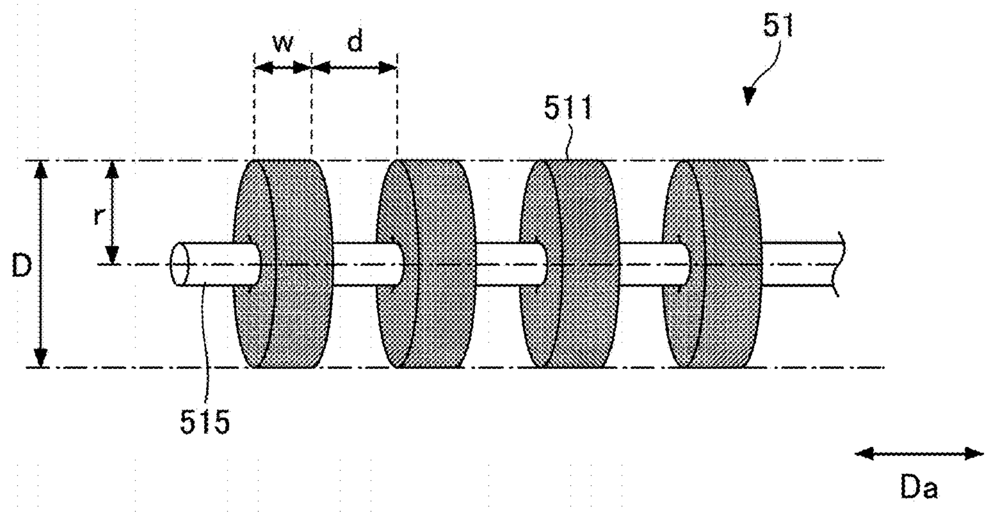
FIG. 6 is a diagram illustrating an example of a conveying roller.

FIGS. 5 and 6 illustrate an example of the conveying roller 51 in which the rubber-like member is disposed on the peripheral surface of the shaft body. As illustrated in FIGS. 5 and 6, in the case of the conveying roller 51 including the rubber-like member, the diameter D and the radius r of the conveying roller 51 indicate the diameter and the radius in the configuration including the rubber-like member, respectively.

In the example illustrated in FIG. 5, a string-shaped rubber-like member 511 having a substantially circular cross section is spirally wound around a shaft body 515. In this case, it is preferable that the rubber-like member 511 is wound at an interval d that is 500 mm or less as viewed in the axial direction Da (the direction orthogonal to the transport direction Dt). The length w of the rubber-like member 511 in the axial direction Da may be 2 mm or more and 50 mm or less. The width w may be a length (width) in the axial direction Da in which the rubber-like member continuously comes into contact with the glass plate during conveyance of the flat glass plate.

In the example illustrated in FIG. 6, multiple ring-shaped or tubular rubber-like members 511, 511, and . . . are mounted around the shaft body 515 at predetermined intervals so as to be spaced apart from each other. In this case, the interval d between the multiple rubber-like members 511 in the axial direction Da may be 500 mm or less. In the case that the conveying roller 51 is as illustrated in FIG. 6, it is preferable to provide multiple conveying rollers having such a scratching function. Further, it is preferable that the positions of the rubber-like members 511, 511, and . . . of the conveying rollers adjacent to one another among the conveying rollers are in offset positions with respect to each other in the axial direction Da because the flat glass plate can be more uniformly scratched along the axial direction Da.

The conveying rollers adjacent to one another among the conveying rollers may be touching or may be positioned apart from each other. In the case where they are positioned apart from each other, the interval between the conveying rollers may be 50 cm or less. The angular velocity of the conveying roller used as a normal conveying unit is rad/s or more and 40 rad/s or less, depending on the diameter of the conveying roller and the state of the glass plate to be conveyed.

The scratching in the present production method is performed in the step (p) of preparing a flat glass plate, but more specifically, it can be performed at any timing that is after the annealing step (p2) and before the bend-forming step (A). That is, as long as the scratching is performed on the conveying unit-facing surface of the flat glass plate by the conveying unit, the scratching can be performed after the annealing step (p2) in one or more of the glass plate cutting-out step (p3), the cutting into the desired outer shape step (p4), the chamfering step (p5), the cleansing step (p6), and the shielding layer printing step (p7) (FIG. 3), or either before or after one or more of these steps. However, it is preferable that the scratching is not performed at the timing of the baking of the shielding layer in the shielding layer printing step (p7) and the timing of the subsequent cooling. The scratching can be performed while the glass plate is being conveyed between one step and the subsequent step. In particular, when the scratching is performed between the step of cutting out the glass plate (p3) and a timing before the cleansing step (p6), even if glass powder or the like not visible to the human eye generated by polishing gets attached, it can be removed by cleansing, and this is preferable. The scratching process may be performed at two or more different timings as long as the scratching process is performed after the annealing step (p2) and before the bend-forming step (A) is started.

When the roller conveyor 50 (FIG. 4) is used as the conveying unit, the scratching function of the roller conveyor can be obtained, for example, by making one or more of the rotational speed, the diameter, and the height of at least one conveying roller among the multiple conveying rollers 51, 51, and . . . different from those of conveying rollers adjacent to the at least one conveying roller.

Figure 7:
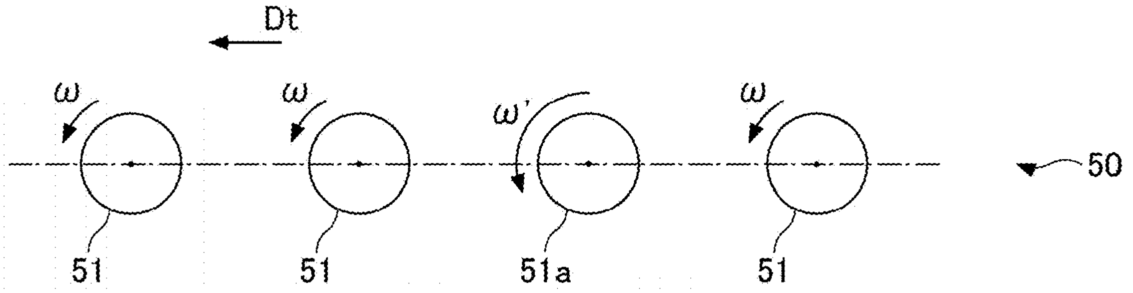
FIG. 7 is a diagram for describing an example of a scratching function of the conveying unit.

For example, FIG. 7 schematically illustrates a cross section of an example of a roller conveyor 50 having a scratching function. As illustrated in FIG. 7, the angular velocity or rotational speed (driving speed) ω' of one conveying roller 51*a* can be adjusted to be larger or smaller than the angular velocity ω of the conveying roller 51 adjacent to the one conveying roller by 0.3% or more and 5% or less, preferably 0.5% or more and 2% or less. That is, the value of $(\omega'-\omega/\omega)\times 100$ can be used as the percentage in the above range. In this case, it is preferable that the angular velocity of one conveying roller is set to be larger than the angular velocity of the conveying roller that is downstream and adjacent to the one conveying roller by the percentage of the range. Alternatively, it is preferable that the angular velocity of one conveying roller is set to be smaller than the angular velocity of the conveying roller that is upstream and adjacent to the one conveying roller, by a percentage in the range.

In addition, the conveying rollers 51*a* having different angular velocities may be multiple conveying rollers arranged continuously or discontinuously. Therefore, the angular velocity of the one or more conveying rollers can be adjusted to be larger or smaller than the angular velocity of either or both of the conveying roller adjacent and upstream to the one or more conveying rollers and the conveying roller adjacent and downstream to the one or more conveying rollers by the percentage in the aforementioned range.

Figure 8:
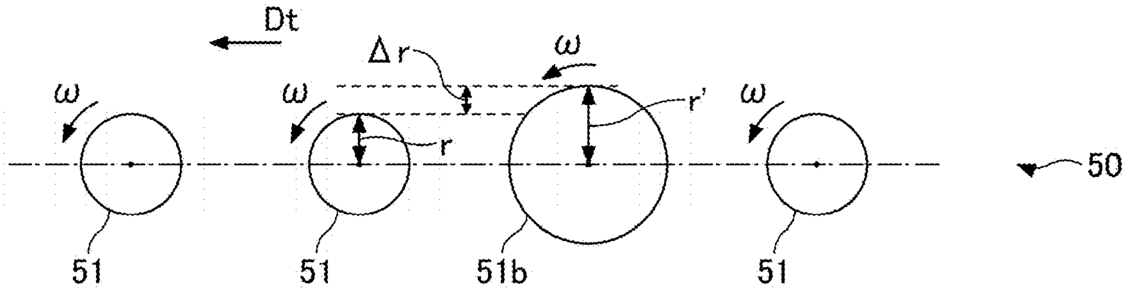
FIG. 8 is a diagram for describing another example of the scratching function of the conveying unit.

FIG. 8 schematically illustrates a cross section of another example of the roller conveyor having a scratching function. As illustrated in FIG. 8, for example, the radius r' of a single conveying roller 51*b* can be adjusted to be larger than the radius r of the conveying roller 51 adjacent to the one conveying roller 51*b* by 5 μm or more and 2 mm or less, preferably 10 μm or more and 1 mm or less. That is, r'-r can be adjusted so as to be a value in the above range. Here, in the case where the rubber-like member is disposed around the shaft body, the radii r and r' of the conveying roller are the radii including the rubber-like member as described above (FIGS. 5 and 6).

In the case of the example illustrated in FIG. 8, it is preferable that the radius of one conveying roller is set to be larger than the radii of both the conveying roller on the downstream side and the conveying roller on the upstream side of the one conveying roller by a predetermined value. Note that the conveying roller 51*b* made to have a different radius may be multiple conveying rollers that are arranged continuously or discontinuously. As illustrated in FIG. 8, the conveying roller 51*b* having a different radius protrudes toward the glass plate side beyond the adjacent conveying roller by Δr, and thus when the glass plate passes over the conveying roller 51*b*, the conveying roller 51*b* receives the weight of the glass plate more than the other adjacent conveying rollers 51, 51, and . . . , and when the conveying roller 51*b* rotates, the surface facing the conveying unit is rubbed with a stronger force and thus can be scratched.

Substantially the same effect can also be obtained by adjusting the height (position) of one or more conveying rollers to be higher than the height of the one or more conveying rollers by 5 μm or more and 2 mm or less, and preferably 10 μm or more and 1 mm or less without changing the radius of the conveying rollers.

The roughening of the surface of the conveying roller can be obtained, for example, by rubbing the surface of the conveying roller wholly or partially with an abrasive agent, an abrasive paper or the like, obtainable, for example, by covering the conveying roller with a covering sheet having a rough surface. The roller conveyor (conveying unit) having a scratching function can also be obtained by roughening the surface of at least one of multiple conveying rollers, that is, by forming irregularities on the surface of at least one of the conveying rollers. Although the degree of roughening depends on: the type of glass plate to be scratched; the size and shape of the ribbon-shaped glass plate or the glass plate;

and the like, the conveying roller can be configured to have a rough surface having an arithmetic average roughness Ra, defined in Japanese Industrial Standard (JIS) B 0601-2013, of 0.02 μm or more and 100 μm or less.

The roughening of the surface of the conveying roller can be obtained, for example, by wholly or partially rubbing the surface of the conveying roller with an abrasive agent, abrasive paper, or the like. Alternatively, fine powder may be adhered and fixed to the surface of the conveying roller. Alternatively, the rubber-like substance on the surface that is typically used can be changed to a rubber-like substance into which a powder for scratching is kneaded. It is also possible to cover the entirety or a portion of the surface of the conveying roller with a covering sheet having a rough surface. The covering sheet may be a sheet made of resin, rubber, a fiber-containing material (woven fabric, knitted fabric, non-woven fabric, paper, or the like), or the like and having a rough surface; or may be such a sheet having a surface to which fine powder is adhered and fixed.

The sheet having the rough surface is preferably provided over a range corresponding to the entire width of the ribbon-shaped glass plate or the glass plate to be scratched. In such a case, it can be provided along the entire surface of the conveying roller, i.e., along the entirety or substantially the entirety of the conveying roller in the axial direction. Further, the sheet having the rough surface need not be provided over the entire circumferential direction of the conveying roller, and may instead be provided by spirally winding a ribbon-shaped or string-shaped sheet around the surface of the conveying roller.

In the case where the conveying roller is provided with a rubber-like member on the peripheral surface of the shaft body thereof (FIGS. 5 and 6), when the conveying roller comes into contact with the glass via a non-slippery material (rubber-like member) such as rubber attached to the conveying roller, the surface of the rubber-like member in contact with the glass can be covered with a covering sheet having a rough surface.

Alternatively, fine powder may be adhered and fixed to the surface of the rubber-like member. Further, a rubber-like material can also be used on the conveying roller into which an abrasive agent such as particles is kneaded. The covering sheet may be a sheet made of resin, rubber, a fiber-containing material (woven fabric, knitted fabric, non-woven fabric, paper, or the like) or the like and having a roughened surface, or may be such a sheet having a surface to which fine powder is adhered and fixed.

The sheet to which the fine powder is adhered and fixed includes a sheet to which hard abrasive particles such as silica, sand, and ceramics are fixed, one example being sandpaper. In the case where sandpaper is used, the grit thereof may be preferably from #600 to #15,000, more preferably from #600 to #12,000, or even more preferably from #600 to #8,000. Further, in the above-mentioned range of the grit of the sandpaper, the larger the mesh size (the smaller the grit) is, the more the scratching effect is improved. However, in the case where sandpaper is used, particularly where sandpaper of #2,000 or less is used, it is preferable to use the sandpaper without moving the sandpaper relative to the glass plate.

The above-described scratching by the conveying unit is a treatment performed so that the in-plane strength of the glass plate is more uniform. Therefore, the scratching process can be regarded as a process by which the in-plane strength distribution of the flat glass plate or variation in in-plane strength of the flat glass plate is suppressed. In other words, in the case where a distribution of strength values (breaking stress or bending strength) measured in multiple regions in the plane of the glass plate is determined, the scratching can be regarded as a process by which adjustment is performed so that the distribution is narrowed. In addition, in the scratching performed in the production method according to the present embodiment, strength satisfying sufficient toughness as window glass can also be maintained. Therefore, for example, in a case where the surface of the glass plate is divided into multiple regions and the strength of each region is measured to determine the frequency distribution of the strength, a result is obtained in which the distribution region with high strength is shifted to a lower value and the position of the distribution region with low strength does not change much, by the scratching process. Alternatively, a result is obtained in which the highest value of the strength is shifted to a lower value and the lowest value of the strength does not change much, by the scratching process.

The effect of the scratching process obtained in the present embodiment is slightly reduced when the glass plate or laminated glass is stored for a long period of time, but can be maintained to an extent sufficient to ensure the bodily protection performance for a person at the time of collision regardless of the conditions of either or both of the temperature and humidity during storage. Further, the effect of the scratching process can be similarly sufficiently maintained even when heating is performed to a temperature equivalent to the temperature of the heating furnace used for bend forming.

The scratching may be performed such that the difference between the average of the top 20% of the strength distribution of the scratched surface and the average of the top 20% of the strength distribution of the surface before the scratching is MPa or more, and the difference between the average of the bottom 10% of the strength distribution of the scratched surface and the average of the bottom 10% of the strength distribution of the surface before the scratching is MPa or less. The reduction percentage of the average value of the top 20% of the strength distribution of the surface due to the scratching may be 10% or more, and the reduction percentage of the average value of the bottom 10% of the strength distribution of the surface due to the scratching may be 20% or less.

Further, in a case where the strength distributions of the conveying unit-facing surface before and after the scratching are determined, the scratching can be performed such that the reduction percentage $R_{U20}$ of the average value of the top 20% of the strength distribution of the conveying unit-facing surface due to the scratching is 10% or more, preferably 20% or more, and the reduction percentage $R_{L10}$ of the average value of the bottom 10% of the strength distribution of the conveying unit-facing surface due to the scratching is 20% or less, preferably 10% or less. Here, the reduction percentage $R_{U20}$(%) is equal to $\{(Sb_{U20}-Sa_{U20})/Sb_{U20}\}\times 100$, where the average value of the top 20% of the strength distribution of the conveying unit-facing surface before scratching is denoted by $Sb_{U20}$, and the average value of the top 20% of the strength distribution of the conveying unit-facing surface after scratching is denoted by $Sa_{U20}$. The reduction percentage $R_{L10}$(%) is equal to $\{(Sb_{L10}-Sa_{L10})/Sb_{L10}\times 100$, where the average value of the bottom 10% of the strength distribution of the conveying unit-facing surface before scratching is denoted by $Sb_{L10}$, and the average value of the bottom 10% of the strength distribution of the conveying unit-facing surface after scratching is denoted by $Sa_{L10}$.

Although the aforementioned method for measuring the strength is not particularly limited as long as the measurement conditions before and after the scratching are the same, the strength can be measured and calculated by the method using R30 described in ISO 1288-5:2016 described further below.

As described above, the scratching process in the present embodiment can be performed such that the average value of the top 20% or more of the strength distribution is significantly reduced, that is, the region where the strength is excessively high is reduced; and the average value of the bottom 10% or less of the strength distribution, that is, the region where the strength is low is not excessively low or such a region is not excessively increased.

Further, in a case where the strength distributions of the conveying unit-facing surface before and after the scratching are determined, the scratching can be performed such that the difference ($Sb_{U20}$-$Sa_{U20}$) between the average ($Sb_{U20}$) of the top 20% of the strength distribution of the conveying unit-facing surface before the scratching and the average ($Sa_{U20}$) of the top 20% of the strength distribution of the conveying unit-facing surface after the scratching is 50 MPa or more, preferably MPa or more, and the difference ($Sb_{L10}$-$Sa_{L10}$) between the average ($Sb_{L10}$) of bottom 10% of the strength distribution of the conveying unit-facing surface before the scratching and the average ($Sa_{L10}$) of the bottom 10% of the strength distribution of the conveying unit-facing surface after the scratching is 50 MPa or less, preferably 30 MPa or less. The strength in this case as well can be defined as breaking stress measured by a method using R30 described ISO 1288-5:2016.

Further, in the case where the strength distribution is determined for each of the conveying unit-facing surface of the scratched glass plate and the non-facing surface (F2 in FIG. 4) opposite to the conveying unit-facing surface, the glass plate can be scratched such that the difference ($Sn_{U20}$-$Sf_{U20}$) between the average ($Sn_{U20}$) of the top 20% of the strength distribution of the non-facing surface and the average ($Sf_{U20}$) of the top 20% of the strength distribution of the conveying unit-facing surface is 50 MPa or more, preferably 70 MPa or more, and the difference ($Sn_{L10}$-$Sf_{L10}$) between the average ($Sn_{L10}$) of the bottom 10% of the strength distribution of the non-facing surface and the average ($Sf_{L10}$) of the bottom 10% of the strength distribution of the conveying unit-facing surface is 50 MPa or less, preferably 30 MPa or less. In this case, the strength can be defined as the breaking stress measured by a method using R30 described in ISO 1288-5:2016.

In the method described in ISO 1288-5:2016, a glass plate to be tested is placed on a support ring having a predetermined diameter, a load is gradually increased from above the glass plate by a load ring having a predetermined diameter that is smaller than the support ring, and a load at the time of breakage is measured. The load is applied from the side opposite to the surface for which the strength is to be determined. Then, from the obtained measured values, the breaking stress value is determined based on a predetermined mathematical expression described in ISO 1288-5:2016. Here, in order to determine the in-plane strength distribution, the glass plate is cut out into a predetermined size and divided. Thus, the breaking stress can be measured for each divided region. At this time, the size of the glass after the dividing (after cutting) is not particularly limited, and may be 60 mm to 300 mm×60 mm to 300 mm. The number of divided samples for determining the strength distribution may be preferably 30 or more, and more preferably 50 or more. When the measurement target is not a flat plate but rather a curved glass plate or laminated glass, the breaking stress of the cut curved region is measured. In the measurement and calculation in this case, the breaking stress value can be determined by deriving an approximate mathematical expression by stress measurement and substituting the measured value into the approximate mathematical expression without using the predetermined mathematical expression described in the ISO mentioned above.

The scratching by the aforementioned conveying unit can also be performed by interposing water or an aqueous liquid between conveying unit-facing surface of the glass plate and the conveying unit. The water or aqueous liquid can be applied, sprinkled, or sprayed onto the surface of the conveying unit prior to the scratching. However, when scratching is performed in the cleansing step (step 6 in FIG. 3 or cleansing other than step 6), there is no need to add water or an aqueous liquid because a cleansing liquid (including a detergent liquid and a rinsing liquid) is interposed between the glass plate and the conveying unit.

As illustrated in FIG. 3, in the present embodiment, the bend-forming step (A) is performed after the preparation step (p) including the scratching by the conveying unit as described above. The bend-forming step (A) is a step of causing the flat glass plate to be curved by heating the flat glass plate until the state of the glass plate is close to the softening point or until the state of the glass plate is at the softening point or higher than the softening point. The bend forming may be gravity bend forming in which the glass plate is placed on a ring mold and the glass plate is bent by its own weight in a heating furnace, press bend forming in which the glass plate is sandwiched and pressed between a ring mold (lower mold) and a press mold (upper mold), or a combination thereof.

In the bend-forming step (A), the glass plate may be bend formed alone, or two glass plates to be bonded together in the subsequent bonding step (B) may be stacked and then bent in the stacked state. In either case, glass plates often are curved so as to be downwardly (downward in the vertical direction) convex in many cases. Here, in the flat glass plate preparing step (p), as described above, at least one of the two glass plates is scratched on the conveying unit-facing surface (downward-facing surface) thereof. In a case where curved laminated glass it to be used for a windshield or the like, however, it is preferable that the surface (either or both of the second surface 12 and the fourth surface 22) on the vehicle-interior side, which is a concave surface is scratched. Therefore, when the glass plate is formed in a state of being placed horizontally, in the method according to the present embodiment, it is preferable to turn over the scratched glass plate after the scratching process is performed by the conveying unit in the preparing step (p). As a result, the scratched surface faces upward in the vertical direction, and when the glass plate is sent to the bend-forming step (A) and bend formed with the scratched surface facing upward, a glass plate having a scratched concave surface is obtained.

The heating temperature of the glass during bend forming may be approximately 550° C. or more and 700° C. or less. The bend-forming step (A) may be single bending formation in which a flat glass plate is bent only in one direction, for example, only in the left-right direction or the up-down direction of an automobile upon the glass plate being attached to an opening of the automobile, or may be double bending formation in which the glass plate is bent in both the left-right direction and the up-down direction upon the glass plate being attached to an opening of the automobile. The radius of curvature of the glass plate obtained by the bend-forming step (A) may be 200 mm or more and mm or less. In addition, the radius of curvature of the vehicle-exterior side glass plate and the vehicle-interior side glass plate 20 in the automobile window laminated glass 1 may be the same or different from each other. It is to be noted that the effect of the above-described scratching process of this embodiment can be maintained even after the heating at the time of the above-described bend forming.

The laminating step (B) is a step of bonding together the two glass plates bend formed in the bend-forming step (A) via an interlayer film to obtain laminated glass. In the bonding step (B), the two glass plates are laminated such that the surface of the glass plate that was the conveying unit-facing surface when the glass plate was scratched in the preparing step (p) becomes the surface on the vehicle-interior side upon attaching the glass plate to the automobile, and then the two glass plates are bonded. The laminating step (B) may include a preliminary pressure-bonding step in which the above-described resin interlayer film is interposed between two glass plates to form a laminate, and the laminate is placed in a rubber bag and heated under reduced pressure to perform a degassing treatment, and then a step of heating and pressurizing the laminate in an autoclave to perform final pressure-bonding. The preliminary pressure-bonding step may be performed by a rubber channel method or a nip roller method.

Embodiment b

Figure 9:
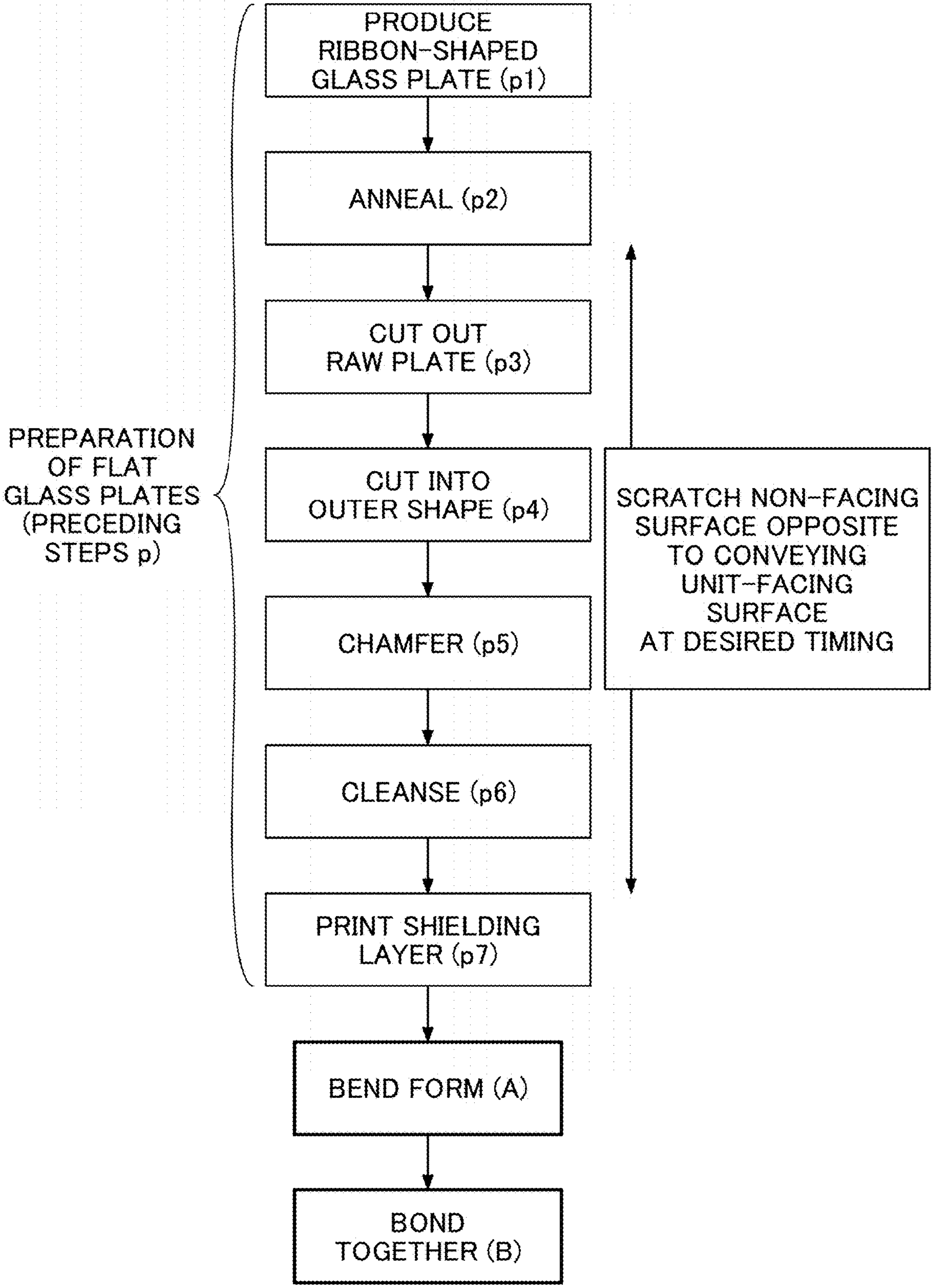
FIG. 9 illustrates a flowchart of an example of a method for producing laminated glass according to Embodiment b of the present disclosure.

Next, a method for producing laminated glass for automobile windows according to Embodiment b which is another embodiment of the present disclosure is described. FIG. 9 is a flowchart illustrating an example of a method for producing laminated glass for automobile windows according to the present embodiment. As illustrated in FIG. 9, the production method of the present embodiment includes a step (A) of bend forming flat glass plates and a step (B) of bonding together the two bend-formed glass plates. Also, the present production method includes steps (p) of preparing flat glass plates to be provided to the bend-forming step, as steps preceding the bend-forming step (A).

As illustrated in FIG. 9, the aforementioned flat glass plates preparing steps (p) may include producing a long ribbon-shaped glass plate by a float method, a roll-out method, or the like (p1), annealing the ribbon-shaped glass plate (p2), cutting out a raw plate from the ribbon-shaped glass plate (p3), cutting the raw plate into a desired outer shape (p4), chamfering (p5), cleansing (p6), and printing a shielding layer (p7). These steps p1 to p7 are examples, and the order of the individual steps p1 to p7 may be partially changed. In addition, some of these steps may be changed or omitted, or an additional step other than the steps p1 to p7 may be included at any timing of the steps p1 to p7. For example, one or more additional cleansing steps besides the cleansing step (p6) may be added at any timing between the end of the annealing step (p2) and the chamfering step (p5).

Conventionally, there has been demand for laminated glass for automobile windows to have various properties and functions related to safety, and the demand for such properties and functions is on the rise. In particular, nowadays, importance is being placed on not only the standpoint of occupant protection but also on the standpoint of bodily protection of a pedestrian or the like (a pedestrian, a cyclist, or the like) in a case where there is a collision with the pedestrian. Laminated glass for automobile windows is also required to satisfy specific standards such as the Head Injury Criterion (HIC) on the assumption that the laminated glass has appropriate toughness as an automobile window glass. For example, an HIC value of less than 1,000, preferably less than 650, may be required in a predetermined region of the laminated glass for automobile windows. Here, in order to improve the performance of protecting the body of a pedestrian or the like at the time of collision, it is important that a region where the strength is excessively high (high strength region) is reduced or eliminated in the laminated glass for automobile windows, and the distribution of the strength over the surface direction is suppressed (the strength distribution is narrow), that is, the in-plane strength is made uniform or equal as much as possible.

The method for producing laminated glass for automobile windows according to the present embodiment includes scratching the surface of the plate glass plate before the bend-forming step. In the present specification, "scratching" is a process of forming minute cracks (also referred to as microcracks, invisible minute cracks on the order of micrometers or less) on the surface of a glass plate. In this embodiment, the strength of the glass plate and the strength of the laminated glass obtained using the glass plate can be made uniform or equal in the plane direction by scratching the surface of the glass plate. Originally, minute cracks are present on the surface of the glass plate after production, and uneven distribution of the minute cracks is said to be a factor of the variation in strength of the glass for automobile windows. However, according to the production method of the present embodiment, it is considered that the strength of a region having excessively high strength (high-strength region) can be reduced by introducing additional minute cracks on the surface of the glass plate by performing scratching. Further, the scratching in the present embodiment is a treatment in which the strength of the region where the strength is relatively low (low-strength region) is not further reduced or is hardly reduced. Therefore, by performing the scratching process in the present embodiment, the in-plane strength of the glass plate or the obtained laminated glass can be made uniform, while still maintaining the requisite strength of the glass for automobile windows. As a result, automobile window laminated glass having a property that ensures the safety of a pedestrian or the like even in a case where the pedestrian or the like collides with the laminated glass, and also having the requisite toughness as glass for automobile windows, can be provided.

In the present embodiment, the scratching process is performed on a surface of at least one of the two flat glass plates to serve as the laminated glass, the surface being situated on the vehicle-interior side upon the attaching of the laminated glass to the automobile. For example, in a case where a pedestrian or the like collides with the windshield of the automobile from the vehicle-exterior side, the impact of the collision is sequentially transmitted from the first surface 11 of the vehicle-exterior side glass plate 10 which is the outermost surface to the fourth surface 22 of the vehicle-interior side glass plate 20 which is the innermost surface (FIG. 2). At this timing, in the vehicle-exterior side glass plate 10, a compressive stress corresponding to the compressive force at which an area is compressed is generated in the first surface 11, and a tensile stress corresponding to the tensile force at which an area is expanded is generated in the second surface 12. Therefore, in the vehicle-exterior side glass plate 10, a crack is likely to start from the second surface 12 on the vehicle-interior side. Therefore, it is preferable that the second surface 12 readily breaks as intended at the time of collision. That is, it is preferable that there is no high-strength region or that there is only a small high-strength region, where the strength is locally excessively high in the second surface 12. Likewise, focusing on the vehicle-interior side glass plate 20, a compressive stress corresponding to a compressive force at which an area is compressed is generated in the third surface 21, and a tensile stress corresponding to a tensile force at which an area is expanded is generated in the fourth surface 22. Therefore, in the vehicle-interior side glass plate cracking is likely to start from the fourth surface 22 on the vehicle-interior side. Therefore, it is preferable that the fourth surface 22 readily breaks as intended at the time of collision. That is, it is preferable that there is no high-strength region or that there is only a small high-strength region, where the strength is locally excessively high in the fourth surface 22. Therefore, in the present embodiment, at least one of the second surface 12 on the vehicle-interior side of the vehicle-exterior side glass plate 10 or the fourth surface 22 on the vehicle-interior side of the vehicle-interior side glass plate 20 is subjected to a scratching process from the standpoint of protecting the body of a pedestrian or the like at the time of collision with the pedestrian. Further, if one of the second surface 12 and the fourth surface 22 is used, it is more preferable to apply the scratching process to the second surface 12 as this surface is more greatly affected by the impact at the time of collision, yet it is even more preferable to apply the scratching process to both the second surface 12 and the fourth surface 22.

The glass plate to be subjected to the scratching process in this embodiment is in a flat plate-shaped state prior to being bent. That is, the scratching process is performed not on the curved surface of the glass plate but rather on the flat surface of the glass plate. The scratching process is preferably performed along the entire surface of the glass plate in order to make the in-plane strength more uniform. However, in the case where the scratching process is performed uniformly on the curved surface of the glass body, it is necessary to change the direction in which the scratching units are opposed to each other or change the scratching unit itself in accordance with the curve of the curved surface, and consequently the process tends to become complicated. Further, in the present embodiment, the scratching process is performed on at least one of the second surface 12 or the fourth surface 22 as described above, that is, on the surface situated on the vehicle-interior side upon obtaining the laminated glass in the bonding step (B) that is performed after the scratching process, and the surface on the vehicle-interior side is a concave surface (FIG. 2). In a case where a concave surface undergoes this scratching process, it is more difficult to scratch the concave surface in accordance with the curve of the curved surface, and consequently configuration of the scratching unit is likely to be limited. Therefore, in the case where the concave surface is to be scratched, there is a possibility that a region left unscratched is formed and consequently a high-strength region remains, and conversely, there is a possibility that a deep scratch gets formed and consequently the strength is excessively lowered, and thus the requisite toughness is not obtained. In contrast to this, scratching of the flat surface of the glass plate is relatively easy because it is not necessary to consider the curvature of the surface, and thus the labor and cost for configuring the scratching unit(s) can be reduced.

The scratching in the present production method is performed in the step (p) of preparing a flat glass plate, but can be performed at any timing after the annealing step (p2) and before the bend-forming step (A). More specifically, the scratching can be performed after the annealing step (p2), in one or more of the glass plate cutting-out step (p3), the cutting into a desired outer shape step (p4), the chamfering step (p5), the cleansing step (p6), and the shielding layer printing step (p7) (FIG. 9), or either before or after one or more of these steps. However, it is preferable that the scratching is not performed at the timing of the cooling of the shielding layer after the shielding layer printing step (p7). The scratching is preferably performed on the glass plate after the cutting of the raw plate into a desired outer shape step (p4). As a result, the scratched region is not cut off, that is, the entire surface of the glass plate having the desired outer shape can be scratched without there being any waste. The scratching process may be performed at two or more different timings as long as the scratching process is performed after the annealing step (p2) is completed and before the bend-forming step (A) is started.

In the case of mass production of laminated glass, a line production system in which processing apparatuses for performing steps as described above are arranged in series is preferably used. In such a case, the ribbon-shaped glass or glass plates is/are transported between the processing apparatuses within one or more processing apparatuses, or a combination thereof by means of the conveying unit. As the conveying unit, a conveying unit that conveys the ribbon-shaped glass plate or the glass plates while supporting the ribbon-shaped glass plate or the glass plates from below is preferable because the conveying unit can convey the ribbon-shaped glass plate or the glass plates more safely and with minimal damage by a simple structure. Specific examples of the conveying unit include a roll conveyor and a belt conveyor (including a flat belt conveyor and a round belt conveyor). Here, the scratching in the present embodiment is performed on the side opposite to the conveying unit. That is, the surface (referred to as a non-facing surface) of the flat glass plate opposite to the surface facing the conveying unit (referred to as the conveying unit-facing surface) is scratched. In a case where the conveying unit is a conveying unit that conveys the glass plate while supporting the glass plate from below, the upper surface of the glass plate is the non-facing surface. As described above, it is preferable that the non-facing surface faces upward, that is, the surface to be scratched faces upward, because the state of the scratching process and the state of the glass plate after the scratching process can be easily checked.

The scratching in the present embodiment can be performed, for example, by bringing a scratching tool into contact with the non-facing surface of the flat glass plate and moving the scratching tool relative to the non-facing surface. The form of the scratching tool is not particularly limited and may be a brush, bristles, a roller, a film, a sheet, a blade, a disc, or the like. Therefore, the scratching tool may be one in which the contact portion with the surface of the glass plate is flat or one in which the contact portion with the surface of the glass plate is discontinuous (one in which the tips of multiple bristles, such as a brush, are in contact with a non-facing surface). The material of the scratching tool may be a ceramic, a metal, a synthetic resin (plastic), a natural material, or the like. Further, the material may be a foamed body such as a foamed resin formed body. In a case where a scratch-applying tool that comes into planar contact with the surface of the glass plate, the scratch-applying tool may be in the form of a resin sheet formed by extrusion molding or the like, or may be a fiber structure formed by aggregating fibers three dimensionally or planarly, and may be felt, cloth (including woven fabric and knitted fabric), nonwoven fabric, paper, or the like. When the scratching tool is made of a resin or the material of the scratching tool contains a resin, specific examples of the resin include ultra-low-density polyethylene, linear low-density polyethylene, low-density polyethylene, high-density polyethylene, polypropylene, polystyrene, polyurethane, silicone resin, EVA, and olefin elastomer. The tool may be composed of one of the above materials or of a combination of two or more thereof.

At least part of the surface of the tool to be brought into contact with the glass plate may be smooth or may be formed with fine irregularities having an arithmetic mean roughness (surface roughness) Ra of 0.02 μm or more and 100 μm or less as defined in JIS B 0601-2013. Such slight irregularities on the surface of the tool may be inherent in the material (such as irregularities formed by the arrangement of fibers in a fibrous structure). In addition, at least a portion of the surface of the tool to be brought into contact with the glass plate may be subjected to surface roughening treatment, may be fixed by attaching fine powder thereto, or may be formed by kneading powder at the time of molding a material such as a resin. In addition, in the case of a fiber or a cloth in which bundled fibers are twisted or woven, unevenness formed by the bundled fibers or the like is formed, but the presence of these is permissible.

The tool (scratching tool) for the scratching process may be one in which the above-described fine powder is adhered and fixed to a sheet. Examples of such a sheet include a sheet in which hard abrasive particles such as silica, sand, and ceramics are fixed, one example being sandpaper. In the case where sandpaper is used, the grit thereof is preferably from #600 to #15,000, more preferably from #600 to #12,000, or even more preferably from #600 to #8,000. Further, in the above-mentioned range of the grit of the sandpaper, the larger the mesh size (the smaller the grit) is, the more the scratching effect is improved. However, in the case where sandpaper is used, particularly where sandpaper of #2,000 or less is used, it is preferable to use the sandpaper without moving the sandpaper relative to the glass plate.

In the case where the sheet to which the fine powder is adhered and fixed as described above is used, the surface of the sheet to which the powder is adhered is placed so as to face the surface to be subjected to the scratching process (the non-facing surface in the case of the Embodiment b), and a load can be applied from above. The means for applying a load is not particularly limited, but a roller is preferably used from the standpoint that a more uniform load can be applied along the entire surface of the glass plate. For example, a roller can be rolled from above the sheet on the side of the surface of the glass plate on which the sheet (scratching tool) is placed, or pressure can be applied from both sides of the glass plate by passing the glass plate between a pair of rollers. Alternatively, a roller around which a sheet (scratching tool) is wound such that a rough surface (a surface to which a which a small amount of powder is adhered) is exposed is prepared, and such a roller can be rolled while being in contact with a surface to be scratched. Further, the glass plate may be passed between a roller around which the sheet to which the fine powder is adhered is wound and another roller opposed to the roller to scratch the glass plate.

Further, an abrasive agent may be used for the scratching. In the present specification, the abrasive agent refers to a powder having fluidity and an abrasive action that can be sprayed or dispersed in a solvent. By using the abrasive agent, scratching can be easily performed even with a scratching tool having no slight irregularities formed on the surface thereof. In the case where the abrasive agent is used, the non-facing surface can be scratched by spraying the abrasive on the non-facing surface of the flat glass plate and then wiping or sweeping the surface with the scratching tool. At such a timing, the scratching tool can be moved along the surface of the glass plate relative to the glass plate either with or without application of a pressing force. The abrasive agent may be a dry powder, a powder wetted with a liquid, or a slurry or liquid in which a powder is dispersed in a liquid. In such a case, the liquid is not particularly limited as long as it does not denature the surface of the glass plate, and may be one or more of water, an aqueous liquid, and an organic solvent, and the liquid may be volatile or non-volatile. In the case where the abrasive is a slurry or liquid abrasive, the liquid abrasive may be prepared in advance by mixing the powder with an aqueous liquid, or the scratching process may be carried out by spraying the powder on the surface of the glass plate and then spraying the liquid, or by spraying the liquid and then spraying the powder, and then bringing the glass plate into contact with the scratching tool.

As described above, in the present embodiment, an abrasive agent containing a liquid such as water or an aqueous liquid may be used, or a liquid such as water or an aqueous liquid may be added to a powdery abrasive to perform scratching. That is, at the time of scratching, a liquid such as water or an aqueous liquid can be interposed between the scratching tool and the non-facing surface of the glass plate. As described above, the presence of the liquid, particularly water, can prevent a temperature rise which may be caused by abrasion of the scratching tool; can prevent scattering of powder contained in the abrasive or scattering of fine debris generated from the glass plate; and can facilitate chemical polishing. Therefore, in the case where scratching is performed in the cleansing step (the step p6 in FIG. 9 or in the case where any cleansing performed at a timing other than the step p6) or after the cleansing step, the moisture used in the cleansing step can be utilized, and this is preferable.

The powder used in the abrasive agent for scratching may include an inorganic material, an organic material or both, but it is preferred that the powder is an inorganic powder. Examples of the inorganic powder include cerium oxide, glass beads, titanium oxide, diamond, calcium carbonate, anhydrous silicic acid, sodium hydrogen phosphate, silicon nitride, silicon carbide, and aluminum oxide. Among them, cerium oxide is preferable from the standpoint of high hardness and polishing-assisting action by a chemical reaction with glass.

These powders may be used alone or in combination of two or more thereof. The average diameter (D50) of the powder to be used measured by the method (wet method) described in JIS Z 8825:2013 is preferably 0.1 μm or more and 100 μm or less, more preferably 0.2 μm or more and 30 μm or less, and even more preferably 0.2 μm or more and 15 μm or less. In the case where the particle diameter (median diameter) of the powder is 0.1 μm or more, the polishing effect can be enhanced thereby facilitating the uniformity of the in-plane strength distribution. In the case where the particle diameter is 100 μm or less, an occurrence of visible scratches can be avoided and the necessary toughness of the glass plate or the obtained laminated glass can be prevented from being impaired.

In the case where the abrasive agent is used, the abrasive agent can be removed after the non-facing surface of the glass plate is polished using the scratching tool. For example, cleansing can be performed by spraying or pouring a liquid such as water or an organic solvent. In this case, a tool similar to the above-mentioned scratching tool may be used. When the scratching is performed at a stage before the cleansing step (the step p6 in FIG. 9 or any cleansing performed at a timing other than the step p6), the abrasive agent can be removed by the cleansing step, and thus the operation of removing the abrasive agent can be omitted.

When the scratching tool is moved relative to the glass plate, the scratching tool can be moved in any direction on the non-facing surface of the glass plate. The motion may be a one way motion in one direction, a reciprocating motion in a predetermined direction, a rotational motion, or a combination thereof. In addition, when the scratching tool is moved, the scratching tool can be moved while applying a predetermined pressing force to the surface of the glass plate, without applying any pressing force, or substantially without applying a pressing force. The scratching tool may be connected to a driving unit such as an electric motor; a control unit; and the like, and by doing so the scratching speed, the pressing force, and the like can be controlled.

The speed at which the scratching tool rubs the surface of the glass plate may be 1 mm/sec or more and 6 m/sec or less. Further, when the abrasive agent is used and the surface of the scratching tool in contact with the non-facing surface of the glass plate is smooth, the speed at which the scratching tool rubs the surface of the glass plate is preferably 10 mm/sec or more and 3 m/sec or less, or more preferably 20 mm/sec or more and 2 m/sec or less. Conversely, when no abrasive agent is used and irregularities are formed on the surface of the scratching tool that comes into contact with the non-facing surface of the glass plate, the speed at which the scratching tool rubs the surface of the glass plate is preferably 1 mm/sec or more and 1 m/sec or less, more preferably 2 mm/sec or more and 50 cm/sec or less.

Further, the scratching unit for scratching may be a non-contact type means instead of the scratching tool which is brought into contact with the surface of the glass plate as described above. For example, the scratching can be performed using means for applying electromagnetic energy, thermal energy, light energy, or the like, and for example, plasma treatment, corona treatment, laser irradiation, or the like may be used.

Figure 10:
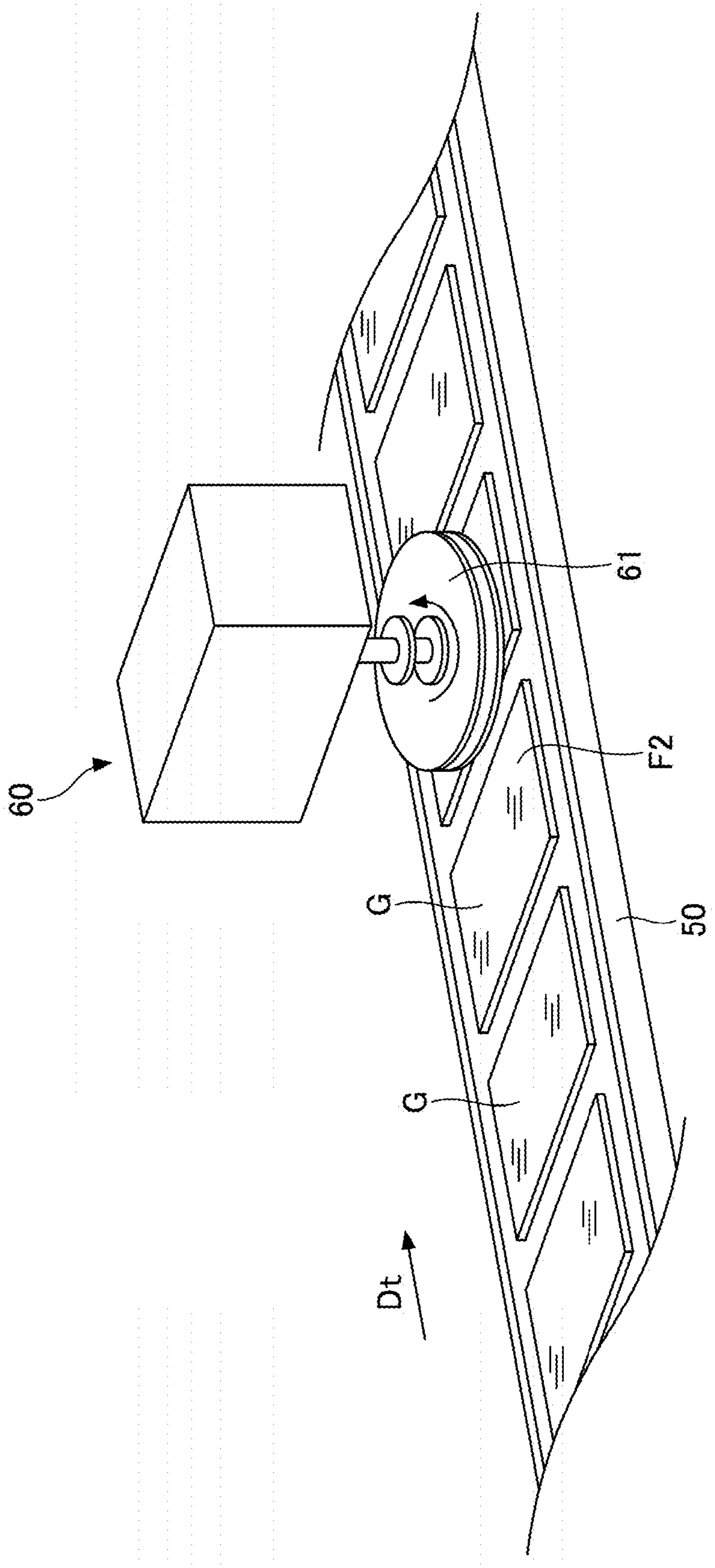
FIG. 10 is a schematic diagram illustrating an example of a scratching process used in the Embodiment b.

FIG. 10 illustrates a specific example of the scratching unit in the Embodiment b. As an example, FIG. 10 illustrates a state in which the scratching is performed at a timing after the flat glass plate (raw plate) is cut out (step p3) from the ribbon-shaped glass. In the example illustrated in FIG. 10, the cut flat glass plates G, G, and . . . are supported from below by a flat belt conveyor (conveying unit) 50 and conveyed in the conveying direction Dt. A scratching unit 60 is disposed in a location partway along the conveying unit in the conveying direction Dt, and the scratching unit 60 scratches respective facing surfaces F2 of the flat glass plates G, G, and . . . that are opposite to the surface facing the conveying unit 50. In the example of FIG. 10, the scratching unit 60 may be a polishing machine (grinder) including a rotatable disk-shaped polishing pad 61. In the case where the scratching unit 60 is a polishing machine, the polishing pad 61 may be configured to be capable of rotating motion including rotation, revolution, and both of them, or may be configured to be capable of reciprocating motion.

Owing to the scratching process of the non-facing surface of the flat glass plate described above with specific examples, the in-plane strength of the glass plate can be made uniform. Therefore, the scratching process can be regarded as a process by which the in-plane strength distribution of the flat glass plate or variation in in-plane strength of the flat glass plate is suppressed. In other words, in the case where a distribution of strength values (breaking stress or bending strength) measured in multiple regions in the plane of the glass plate is determined, the scratching can be regarded as a process by which adjustment is performed so that the distribution is narrowed. In addition, in the scratching performed in the production method according to the present embodiment, strength satisfying sufficient toughness as window glass can also be maintained. Therefore, for example, in a case where the surface of the glass plate is divided into multiple regions and the strength of each region is measured to determine the frequency distribution of the strength, a result is obtained in which the distribution region with high strength is shifted in the direction of low strength and the position of the distribution region with low strength does not change much, by the scratching process. Alternatively, a result is obtained in which the highest value of the strength is shifted to a lower value and the lowest value of the strength does not change much, by the scratching process.

The effect of the scratching process obtained in the present embodiment is slightly reduced when the glass plate or laminated glass is stored for a long period of time, but can be maintained to an extent sufficient to ensure the bodily protection performance for a person at the time of collision regardless of the conditions of either or both of the temperature and humidity during storage. Further, the effect of the scratching process can be similarly sufficiently maintained even when heating is performed to a temperature equivalent to the temperature of the heating furnace used for bend forming.

The scratching process may be performed such that the difference between the average of the top 20% of the strength distribution of the scratched surface and the average of the top 20% of the strength distribution of the surface before the scratching is 50 MPa or more, and the difference between the average of the bottom 10% of the strength distribution of the scratched surface and the average of the bottom 10% of the strength distribution of the surface before the scratching is MPa or less. Further, the scratching process may be performed such that the reduction percentage of the average value of the top 20% of the strength distribution of the surface due to the scratching is be 10% or more, and the reduction percentage of the average value of the bottom 10% of the strength distribution of the surface due to the scratching is be 20% or less.

Further, in a case where the strength distributions of the to-be-processed surface or the to-be-scratched surface (non-facing surface) of the glass plate before and after the scratching are determined, the scratching can be performed such that the reduction percentage R1.1-20 of the average value of the top 20% of the strength distribution of the non-facing surface due to the scratching is 10% or more, preferably 20% or more, and the reduction percentage $R_{L10}$ of the average value of the bottom 10% of the strength distribution of the non-facing surface due to the scratching is 20% or less, preferably 10% or less. Here, the reduction percentage $R_{U20}$(%) is equal to $\{(Sb_{U20}-Sa_{U20})/Sb_{U20}\}\times 100$, where the average value of the top 20% of the strength distribution of the non-facing surface before scratching is denoted by $Sb_{U20}$, and the average value of the top 20% of the strength distribution of the non-facing surface after scratching is denoted by $Sa_{U20}$. The reduction percentage $R_{L10}$(%) is equal to $\{(Sb_{L10}-Sa_{L10})/Sb_{L10}\times 100$, where the average value of the bottom 10% of the strength distribution of the non-facing surface before scratching is denoted by $Sb_{L10}$, and the average value of the bottom 10% of the strength distribution of the conveying unit-facing surface after scratching is denoted by $Sa_{L10}$. Although the aforementioned method for measuring the strength is not particularly limited as long as the measurement conditions before and after the scratching are the same, the strength can be measured and calculated by the method using R30 described in ISO 1288-5:2016 described further below.

As described above, the scratching process in the present embodiment can be performed such that the average value of the top 20% or more of the strength distribution is significantly reduced, that is, the region where the strength is excessively high is reduced, and the average value of the bottom 10% or less of the strength distribution, that is, the region where the strength is low is not excessively low or such a region is not excessively increased.

Further, in a case where the strength distributions of the to-be-processed surface or the to-be-scratched surface (non-facing surface) before and after the scratching are determined, the scratching can be performed such that the difference ($Sb_{U20}$-$Sa_{U20}$) between the average ($Sb_{U20}$) of the top 20% of the strength distribution of the to-be-processed surface or the to-be-scratched surface before the scratching and the average ($Sa_{U20}$) of the top 20% of the strength distribution of the to-be-processed surface or the to-be-scratched surface after the scratching is 50 MPa or more, preferably MPa or more, and the difference ($Sb_{L10}$-$Sa_{L10}$) between the average ($Sb_{L10}$) of bottom 10% of the to-be-processed surface or the to-be-scratched surface before the scratching and the average ($Sa_{L10}$) of the bottom 10% of the strength distribution of the to-be-processed surface or the to-be-scratched surface after the scratching is 50 MPa or less, preferably MPa or less. The strength in this case as well can be defined as breaking stress measured by a method using R30 described ISO 1288-5:2016.

In a case where the strength distribution of the to-be-processed surface or the to-be-scratched surface of the scratched glass plate, i.e., the non-facing surface that is the opposite to the conveying unit-facing surface in the present embodiment and the strength distribution of the conveying unit-facing surface that that is the not-to-be-processed surface or the not-to-be-scratched surface are determined, the scratching can be performed such that the difference ($Sf_{U20}$-$Sn_{U20}$) between the average ($Sf_{U20}$) of the top 20% of the strength distribution of the conveying unit-facing surface (not-to-be-processed surface) and the average ($Sn_{U20}$) of the top 20% of the strength distribution of the non-facing surface (to-be-processed surface) is 50 MPa or more, preferably 70 MPa or more and the difference ($Sf_{L10}$-$Sn_{L10}$) between the average ($Sf_{L10}$) of the bottom 10% of the strength distribution of the non-facing surface and the average ($Sn_{L10}$) of the bottom 10% of the strength distribution of the non-facing surface (to-be-processed surface) is 50 MPa or less, preferably 30 MPa or less. In this case, the strength can be defined as the breaking stress measured by a method using R30 described in ISO 1288-5:2016.

In the method described in ISO 1288-a glass plate to be tested is placed on a support ring having a predetermined diameter, a load is gradually increased from above the glass plate by a load ring having a predetermined diameter that is smaller than the support ring, and a load at the time of breakage is measured. The load is applied from the side opposite to the surface for which the strength is to be determined. Then, from the obtained measured values, the breaking stress value is determined based on a predetermined mathematical expression described in ISO 1288-5: 2016. Here, in order to determine the in-plane strength distribution, the glass plate is cut out into a predetermined size and divided. Thus, the breaking stress can be measured for each divided region. At this time, the size of the glass after the dividing (after cutting) is not particularly limited, and may be 60 mm to 300 mm×60 mm to 300 mm. The number of divided samples for determining the strength distribution may be preferably 30 or more, and more preferably 50 or more. When the measurement target is not a flat plate but rather a curved glass plate or laminated glass, the breaking stress of the cut curved region is measured. In the measurement and calculation in this case, the breaking stress value can be obtained by deriving an approximate mathematical expression by stress measurement and substituting the measured value into the approximate mathematical expression without using the predetermined mathematical expression described in the aforementioned ISO. As illustrated in FIG. 9, in the present embodiment, the bend-forming step (A) is performed on the flat glass plate obtained through the preparation step (p) in which the scratching process is included. The bend-forming step (A) is a step of causing the flat glass plate to be curved by heating the flat glass plate until the state of the glass plate is close to the softening point or until the state of the glass plate is at the softening point or higher than the softening point. The bend forming may be gravity bend forming in which the glass plate is placed on a ring mold and the glass plate is bent by its own weight in a heating furnace, press bend forming in which the glass plate is sandwiched and pressed between a ring mold (lower mold) and a press mold (upper mold), or a combination thereof.

In the bend-forming step (A), the glass plate may be bend formed alone, or two glass plates to be bonded together in the subsequent bonding step (B) may be stacked and then bend formed in the stacked state. In either case, glass plates often are curved so as to be downwardly (downward in the vertical direction) convex. Here, in the flat glass plate preparing step (p) in the present embodiment, as described above, at least one of the two glass plates is scratched on the non-facing surface (upward-facing surface) opposite to the conveying unit-facing surface of thereof. In a curved laminated glass used for a windshield or the like, however, it is preferable that the surface (either or both of the second surface 12 and the fourth surface 22) on the vehicle-interior side, which is a concave surface is scratched. Then, in the method according to the present embodiment, after the scratching process is performed in the preparation step (p), the glass plate whose upward-facing surface is scratched is conveyed, and thus the glass plate can be transferred to the bend-forming step (A) without being turned over. The glass plate having a scratched concave surface can be obtained by bend forming the glass plate having the scratched upward-facing surface into a downwardly convex shape by an ordinary method.

The heating temperature of the glass during bend forming may be approximately 550° C. or more and 700° C. or less. The bend-forming step (A) may be single bending formation in which a flat glass plate is bent only in one direction, for example, only in the left-right direction or the up-down direction of an automobile upon the glass plate being attached to an opening of the automobile, or may be double bending formation in which the glass plate is bent in both the left-right direction and the up-down direction upon the glass plate being attached to an opening of the automobile. The radius of curvature of the glass plate obtained by the bend-forming step (A) may be 200 mm or more and mm or less. In addition, the radius of curvature of the vehicle-exterior side glass plate and the vehicle-interior side glass plate 20 in the automobile window laminated glass 1 may be the same or different from each other. It is to be noted that the effect of the above-described scratching process of this embodiment can be maintained even after the heating at the time of the above-described bend forming.

The laminating step (B) is a step of bonding together the two glass plates bend formed in the bend-forming step (A), via an interlayer film to obtain laminated glass. In the bonding step (B), the two glass plates are laminated such that the surface of the glass plate that was scratched in the preparing step (p) (non-facing surface opposite to the conveying unit-facing surface) becomes the surface on the vehicle-interior side upon attaching the glass plate to the automobile, and then the two glass plates are bonded. The laminating step (B) may include a preliminary pressure-bonding step in which the above-described resin interlayer film is interposed between two glass plates to form a laminate, and the laminate is placed in a rubber bag and heated under reduced pressure to perform a degassing treatment, and then a step of heating and pressurizing the laminate in an autoclave to perform final pressure-bonding. The preliminary pressure bonding step may be performed by a rubber channel method or a nip roller method.

<Laminated Glass for Automobile Windows>

Another embodiment of the present disclosure is laminated glass for automobile windows obtained by bonding together the vehicle-exterior side glass plate 10 and the vehicle-interior side glass plate via the interlayer film 30. In this case, where the vehicle-exterior side surface of the vehicle-exterior side glass plate 10 is the first surface 11 and the vehicle-interior side surface of the vehicle-exterior side glass plate 10 is the second surface 12, and the vehicle-exterior side surface of the vehicle-interior side glass plate 20 is the third surface 21 and the vehicle-interior side surface of the vehicle-interior side glass plate 20 is the fourth surface 22 (FIG. 2), one or more of the following Condition 1 to Condition 3 may be satisfied.

Condition 1: The difference ($S1_{U20}$-$S4_{U20}$) between the average value ($S1_{U20}$) of the top 20% of the strength distribution of the first surface 11 and the average value ($S4_{U20}$) of the top 20% of the strength distribution of the fourth surface 22 is 50 MPa or more, preferably 70 MPa or more, and the difference ($S1_{L10}$-$S4_{L10}$) between the average value ($S1_{L10}$) of the bottom 10% of the strength distribution of the first surface 11 and the average value ($S4_{L10}$) of the bottom 10% of the strength distribution of the fourth surface 22 is 50 MPa or less, preferably 30 MPa or less.

Condition 2: The difference ($S1_{U20}$-$S2_{U20}$) between the average value ($S1_{U20}$) of the top 20% of the strength distribution of the first surface 11 and the average value ($S2_{U20}$) of the top 20% of the strength distribution of the second surface 12 is 50 MPa or more, preferably 70 MPa or more, and the difference ($S1_{L10}$-$S2_{L10}$) between the average value ($S1_{L10}$) of the bottom 10% of the strength distribution of the first surface 11 and the average value ($S2_{L10}$) of the bottom 10% of the strength distribution of the second surface 12 is 50 MPa or less, preferably 30 MPa or less.

Condition 3: The difference ($S3_{U20}S4_{U20}$) between the average value ($S3_{U20}$) of the top 20% of the strength distribution of the third surface 21 and the average value ($S4_{U20}$) of the top 20% of the strength distribution of the fourth surface 22 is 50 MPa or more, preferably 70 MPa or more, and the difference ($S3_{L10}$-$S4_{L10}$) between the average value ($S3_{L10}$) of the bottom 10% of the strength distribution of the third surface 21 and the average value ($S4_{L10}$) of the bottom 10% of the strength distribution of the fourth surface 22 is 50 MPa or less, preferably 30 MPa or less.

The strengths of the above-described Condition 1 to Condition 3 may be breaking stresses measured by method in accordance with ISO 1288-5:2016 by applying a load from a surface opposite to a surface for which a strength distribution is to be determined. In the case where the strength of the second surface 12 on the vehicle-interior side of the vehicle-exterior side glass plate 10 and the strength of the fourth surface 22 of the vehicle-interior side glass plate 20 are to be measured, the respective strengths can be measured after the vehicle-exterior side glass plate 10 and the vehicle-interior side glass plate 20 are separated from the laminated glass and the interlayer film 30 is removed. Among the measurements performed under the above Condition 1 to Condition 3, when the value under the Condition 1 is to be determined, the strength can be measured without the need to break the configuration of the laminated glass.

When one or more of Condition 1 to Condition 3 is satisfied, laminated glass in which both a region having excessively high strength and a region having excessively low strength are reduced or eliminated in at least one of the second surface 12 or the fourth surface 22, that is, laminated glass having uniform in-plane strength and sufficient strength as window glass can be obtained. Therefore, according to the present embodiment, laminated glass for automobile windows capable of ensuring bodily protection performance for a pedestrian or the like even when the pedestrian or the like collides with the laminated glass from the outside of the vehicle and having sufficient toughness as an automobile window glass since the laminated glass can appropriately break and absorb the impact when the laminated glass sustains the impact from the outside of the vehicle, can be provided.

Among the above Condition 1 to Condition 3, it is preferable that at least Condition 2 is satisfied. When Condition 2 is satisfied, the in-plane strength of the second surface 12 that is most likely to be affected when the laminated glass sustains an impact from the outside of the vehicle, is made uniform, and a region having excessively high strength is reduced or eliminated. Therefore, the laminated glass can be appropriately broken to enhance the effect of absorbing the impact, and thus the performance of protecting the body of a pedestrian or the like at the time of collision of the pedestrian or the like can be further improved.

In addition, the laminated glass for automobile windows according to the present embodiment may be the automobile window laminated glass 1 (FIG. 2) obtained by bonding together the vehicle-exterior side glass plate 10 and the vehicle-interior side glass plate 20 via the interlayer film 30. In this case, the average value of the top 20% of the breaking stress distribution of a transmittance region measured by a method in accordance with ISO 1288-5:2016 by applying a load from the vehicle-exterior side may be 500 MPa or less, preferably 450 MPa or less. In the present specification, the transmittance region refers to a portion of the laminated glass for automobile windows excluding the shielding layer formed on the laminated glass for automobile windows.

In the laminated glass for automobile windows according to the present embodiment, at least one of the second surface 12 on the vehicle-interior side of the vehicle-exterior side glass plate 10 or the fourth surface 22 on the vehicle-exterior side of the vehicle-interior side glass plate 20 may be provided with the scratching described by the above-described method for producing laminated glass for automobile windows. That is, the laminated glass for automobile windows according to the present embodiment to be produced by a production method including a step (A) of heating and bend-forming two glass plates and a step (B) of bonding the two bend-formed glass plates via an interlayer film, may be obtained by conveying at least one glass plate of the two glass plates that are flat by a conveying unit and scratching either a conveying unit-facing surface of the at least one glass plate or a non-facing surface of the at least one glass plate that is opposite to the conveying unit-facing surface, bend forming the two flat glass plates (A), and bonding together the bend formed two glass plates via the interlayer film (B), wherein the scratched surface is disposed such that the scratched surface is situated on a vehicle-interior side upon the laminated glass being attached to an opening of an automobile.

EXAMPLES

A surface of the glass plate was subjected to a scratching process using the method according to the present embodiment, and the strength, the toughness, and the like were evaluated.

Experiment a: Scratching during Conveyance

[Experiment a1. Strength Test of Flat Glass Plate]

Example a1-1

In the same manner as in a typical mass production process, the ribbon-shaped glass plate formed by a float method was cut into individual glass plates, cut into a windshield shape, chamfered, and cleansed to obtain a flat non-processed glass plate (unscratched glass plate) having a 2 mm thickness before bend forming. In this series of steps, a roller conveyor was used as the conveying unit. Multiple conveying rollers constituting the roller conveyor each had a radius of 50 mm (radius including the rubber ring), and were arranged at a pitch of 20 mm in the conveying direction. Further, as illustrated in FIG. 6, each of the conveying rollers had multiple rubber rings, each having a length of 30 mm in the axial direction, that were mounted around the shaft body thereof and placed at 50 mm intervals so as to be spaced apart from each other.

Example a1-2

Among the series of steps in Example a1-1, in the step of cutting out individual glass plates from the ribbon-shaped glass plate, i.e., before and after the cutting out by the conveying rollers during a period extending from after the ribbon-shaped glass plate fed from the float bath is annealed until the treating step (the cutting into the windshield shape step) which is subsequent to when the glass plate is actually cut out, the conveying unit-facing surface of the flat glass plates were scratched by the conveying rollers. The scratching function of the conveying rollers was imparted by winding a rough-surfaced film ("Trizact (trademark) Film 568XA" manufactured by 3M Co., Ltd.; 75 μm thick) around substantially the entire surfaces of the rubber rings attached to the 20 conveying rollers so that the rough surfaces were exposed. After the scratching, the glass plate was cut into the shape of a windshield, chamfered, and cleansed in the same manner as in Example a1-1 to obtain a flat scratched glass plate having a pre-bend forming thickness of 2 mm.

The glass plates of Example a1-1 (Comparative Example) and Example a1-2 (Example) were each evaluated as follows.

<Measurement of Strength (Breaking Stress)>

In each example, a quantity of 50 glass plate samples, each being 66 mm×66 mm in size and 2 mm thick, were cut from one glass plate, and the strength of each glass plate sample was measured as breaking stress (MPa). The breaking stress was measured by R30 in accordance with ISO 1288-5:2016. More specifically, using a 60 mm diameter support ring and a 12 mm diameter load ring, a load was applied by the load ring at a load rate of 0.3 mm per minute to measure the breaking load. In the case of both Example a1-1 and Example a1-2, the load ring was disposed on the side of the non-facing surface opposite to the conveying unit-facing surface, and the load was applied from the side of the non-facing surface. Furthermore, breaking stresses were determined using the mathematical expression described in ISO 1288-5:2016.

<Evaluation of Strength Uniformity>

Figure 11:
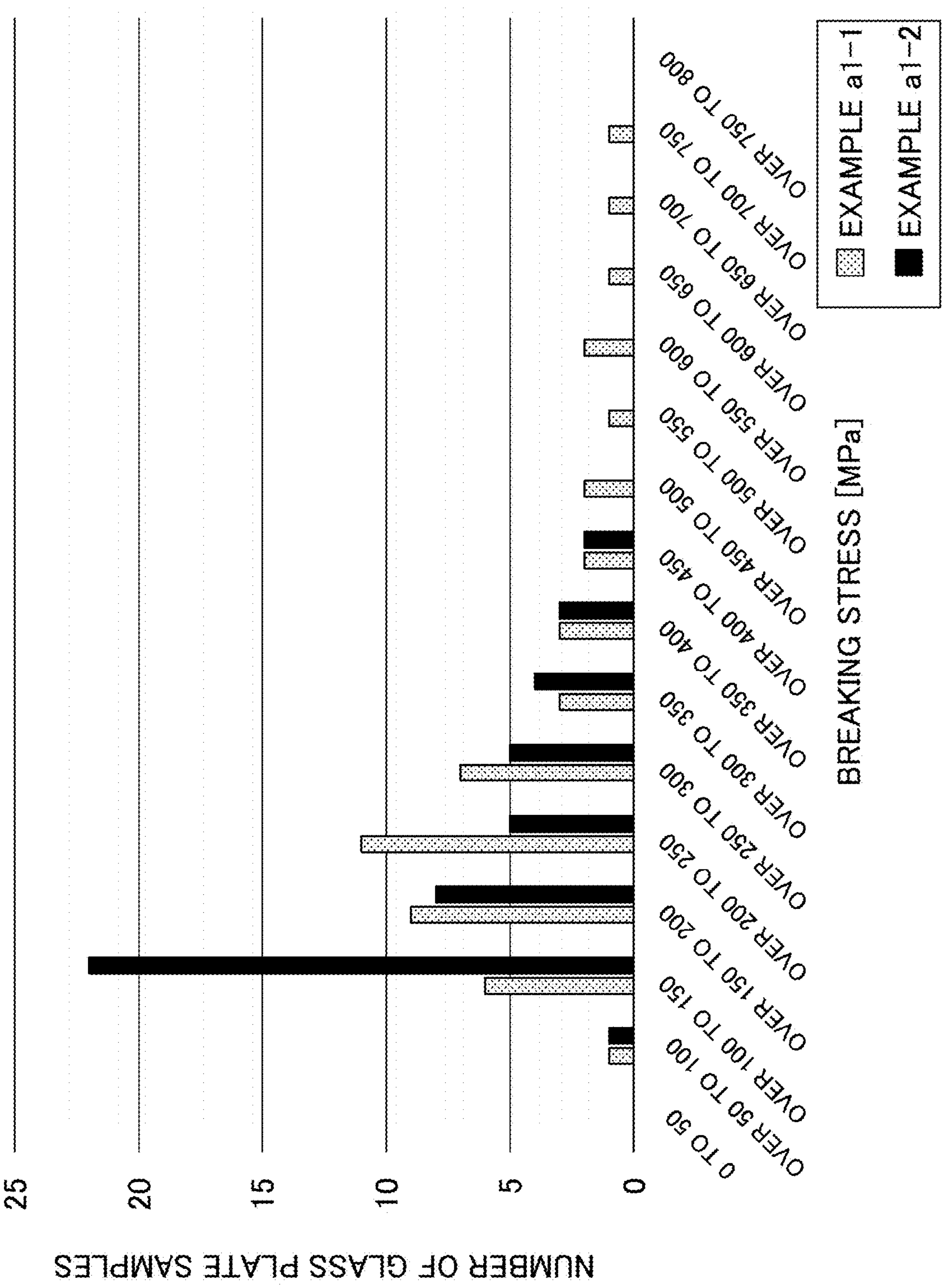
FIG. 11 is a diagram illustrating frequency distributions of strengths of Example a1-1 and Example a1-2.

The pieces of strength data for the aforementioned 50 glass plate samples were used to determine the frequency for every 50 MPa range. FIG. 11 illustrates the respective frequency distributions of Example a1-1 and Example a1-2.

Further, based on the pieces of strength data of the glass plate samples, the pieces of strength data of the top 20% (10 pieces) of the strength distribution were extracted for Example a1 -1 in which the scratching process was not performed, and the average value ($S_{1\text{-}1U20}$) was determined. Likewise, the pieces of strength data of the top 20% (10 pieces) of the strength distribution were extracted from Example a1-2 in which the scratching process was performed, and the average value ($S_{1\text{-}2U20}$) was determined. Then, a strength difference due to the scratching, i.e., a value ($S_{1\text{-}1U20}$-$S_{1\text{-}2U20}$) obtained by subtracting the top 20% average value ($S_{1\text{-}2U20}$) of the strength distribution of Example a1-2 from the top 20% average value ($S_{1\text{-}1U20}$) of the strength distribution of Example a1-1, was determined. Furthermore, the reduction percentage in strength due to the scratching was also determined from $\{(S_{1\text{-}1U20}-S_{1\text{-}2U20})/(S_{1\text{-}1U20})\}\times 100$ (%). The results are illustrated in Table 1 and FIG. 13.

<Evaluation of Toughness>

Likewise, based on the pieces of strength data of the 50 glass plate samples, pieces of strength data of the bottom 10% (5 pieces) of the strength distribution were extracted for Example a1-1 in which the scratching process was not performed, and the average value ($S_{1\text{-}1L10}$) was determined. For Example a1-2 in which the scratching was applied, the pieces of strength data of the bottom 10% (5 pieces) of the strength distribution were extracted, and the average value ($S_{1\text{-}2L10}$) was determined. Then, a strength difference due to the scratch, i.e., a value ($S_{1\text{-}1L10}$-$S_{1\text{-}2L10}$) obtained by subtracting the bottom 10% average value ($S_{1\text{-}2L10}$) of the strength distribution of Example a1-2 from the bottom 10% average value ($S_{1\text{-}1L10}$) of the strength distribution of Example a1-1, was determined. Furthermore, the reduction percentage in strength due to the scratching was also determined from $\{(S_{1\text{-}1L10}-S_{1\text{-}2L10})/(S_{1\text{-}1L10})/\times 100(\%)$. The results are illustrated in Table 1 and FIG. 13.

TABLE 1

(Evaluation of Single Glass Plate)

| Breaking stress | Example a1-1 (Non-processed) | Example a1-2 (With scratching) | Strength difference due to scratching | Reduction percentage in strength due to scratching |
|---|---|---|---|---|
| Overall average [Mpa] | 288 | 193 | Δ 95 | 33.0% |
| Top 20% average [Mpa] | 553 | 352 | Δ 201 | 36.3% |
| Bottom 10% average [Mpa] | 112 | 102 | Δ 10 | 8.9% |

Figure 13:
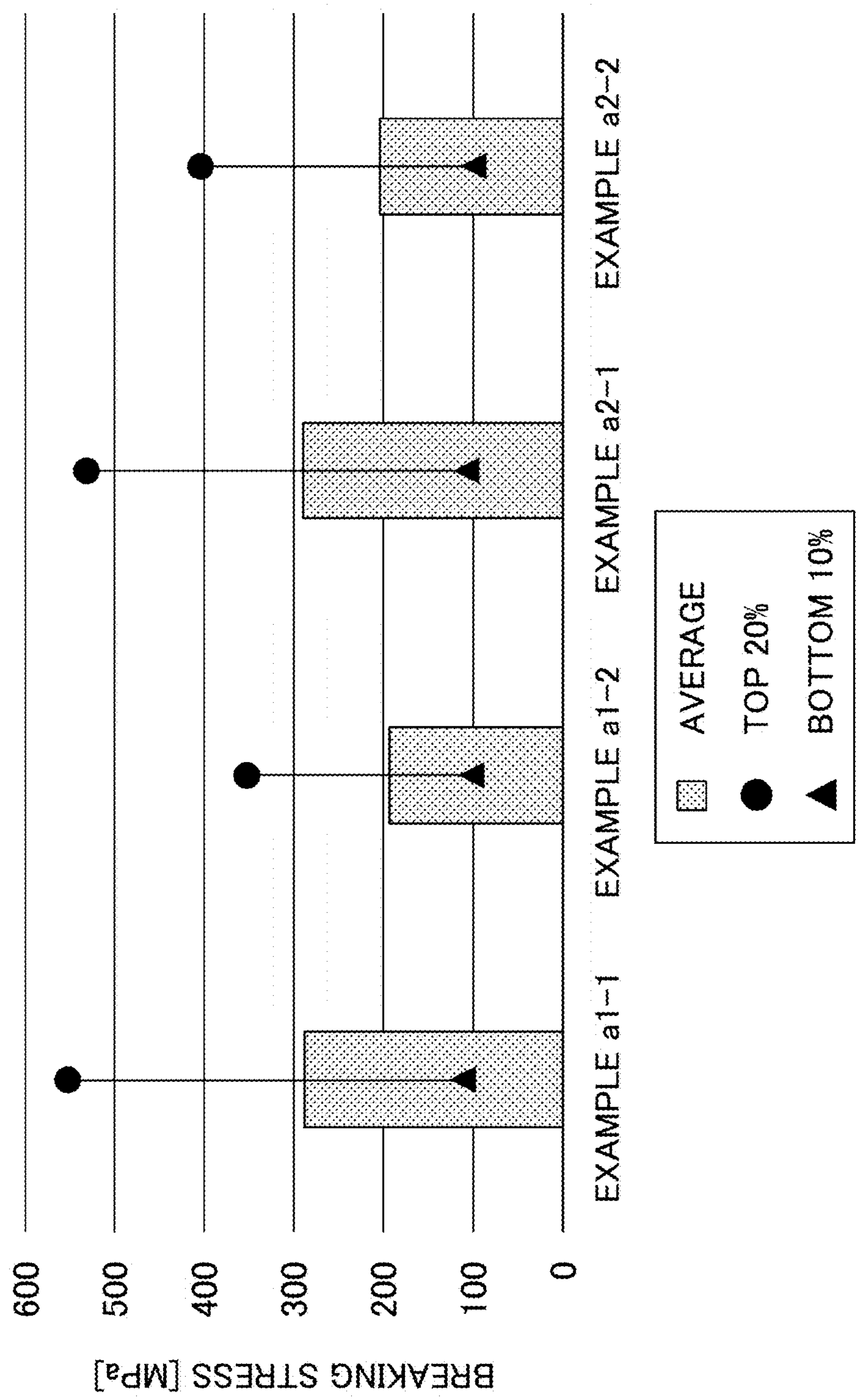

Based on Table 1 and FIGS. 11 and 13, it was found that the variation in the in-plane strength was suppressed, that is, the uniformity of the strength was enhanced, in the glass plate (Example a1-2) in which the conveying unit-facing surface was scratched. In addition, it was also found that the extent of the reduction in the average strength as a whole and the extent of reduction in the strength in the low-strength region in the strength distribution were small, and that the toughness of the glass plate was also maintained.

[Experiment a2. Strength Test of Laminated Glass]

Example a2-1

The 2 mm thick non-processed flat glass plates (unscratched glass plates) obtained in Example a1-1 were each bend formed in the same manner as in the typical mass production process, and two non-processed glass plates were laminated via an interlayer film (PVB-resin) and pressure-bonded to obtain laminated glass (windshield) without undergoing the scratching process. The windshield obtained was a curved laminated glass in which 2 mm a thick glass plate, a 0.76 mm thick interlayer film made of PVB, and a 2 mm thick glass plate were laminated.

Example a2-2

In the series of steps for producing the laminated glass (windshield) in Example a2-1, two sheets of the scratched glass plate produced in Example a1-2 were used instead of the non-processed glass plates (unscratched glass plates) to obtain a scratched laminated glass. When the two scratched glass plates produced in Example a1-2 were laminated, the scratched surfaces (conveying unit-facing surfaces) of the glass plates were both arranged so as to be on the vehicle-interior side.

The laminated glass of Example a2-1 (Comparative Example) and the laminated glass of Example a2-2 (Example) were Each Evaluated as Follows <Measurement of Strength (Breaking Stress)>

In each example, a quantity of 50 glass plate samples, each being 100 mm×100 mm in size were cut from one laminated glass, and the strength of each glass plate sample was measured as the breaking stress (MPa). The breaking stress was measured by R30 in accordance with ISO 1288-5:2016. More specifically, using a 60 mm diameter support ring and a 12 mm diameter load ring, a load was applied by the load ring at a load rate of 1 mm per minute to measure the breaking load. In the case of both Example 2-1 and Example 2-2, the load was applied from the vehicle-exterior side surface of the vehicle-exterior side glass plate (the first surface 11 which is the surface on the vehicle-exterior side of the vehicle-exterior side glass plate 10 in FIG. 2). The breaking stresses were calculated by determining the load-stress relationship using a strain gauge (Kyowa Electronic Instruments Co., Ltd.; KFGS-5-120-D17-11) on two glass plate samples.

<Evaluation of Strength Uniformity>

Figure 12:
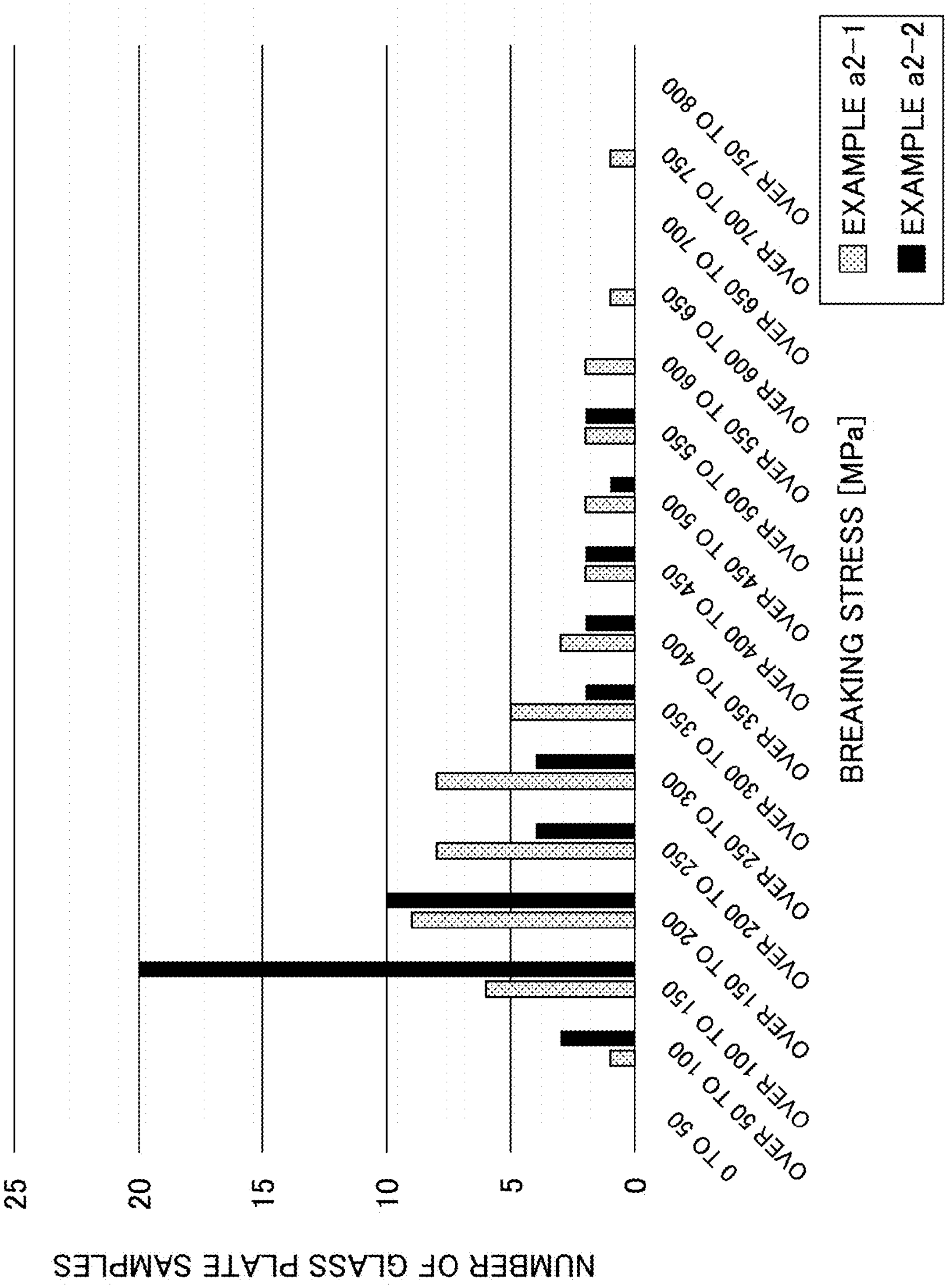
FIG. 12 is a diagram illustrating frequency distributions of strengths of Example a2-1 and Example a2-2.

The pieces of strength data for the aforementioned 50 glass plate samples were used to determine the frequency for every 50 MPa range. FIG. 12 illustrates the respective frequency distributions of Example a2-1 and Example a2-2.

Further, based on the pieces of strength data of the glass plate samples, the pieces of strength data of the top 20% (10 pieces) of the strength distribution were extracted for Example 2-1, which was the non-processed laminated glass, and the average value ($S_{2\text{-}1U20}$) was determined. Likewise, in Example 2-2, which is laminated glass obtained by using scratched glass plates, strength values of the top 20% (10 pieces) of the strength distribution were extracted, and the average value ($S_{2\text{-}2U20}$) was determined. Then, a strength difference due to the scratching, i.e., a value ($S_{2\text{-}1U20}$-$S_{2\text{-}2U20}$) obtained by subtracting the top 20% average value ($S_{2\text{-}2U20}$) of the strength distribution of Example 2-2 from the top 20% average value ($S_{2\text{-}1U20}$) of the strength distribution of Example 2-1, was determined. Furthermore, the reduction percentage in strength due to the scratching was also determined from $\{(S_{2\text{-}1U20}-S_{2\text{-}2U20})-S_{2\text{-}2U20})/(S_{2\text{-}1U20})\}\times100(\%)$. The results are illustrated in Table 2 and FIG. 12.

<Evaluation of Toughness>

Likewise, based on the pieces of strength data of the 50 glass plate samples, the pieces of strength data of the bottom 10% (5 pieces) of the strength distribution were extracted for Example a2-1, which was the non-processed laminated glass, and the average value ($S_{2\text{-}1L10}$) was determined. For Example 2-2, which is the laminated glass obtained using the scratched glass plates, the pieces of strength data of the bottom 10% (5 pieces) of the strength distribution were also extracted, and the average value ($S_{2\text{-}2L10}$) was determined. Then, a strength difference due to the scratching, i.e., a value ($S_{2\text{-}1L10}$-$S_{2\text{-}2L10}$) obtained by subtracting the bottom 10% average value ($S_{2\text{-}2L10}$) of the strength distribution of Example a2-2 from the bottom 10% average value ($S_{2\text{-}1L10}$) of the strength distribution of Example a2-1, was determined. Furthermore, the reduction percentage in strength due to the scratching was also determined from $\{(S_{2\text{-}1L10}-S_{2\text{-}2L10})/(S_{2\text{-}1L10})\}\times100(\%)$. The results are illustrated in Table 2 and FIG. 12.

TABLE 2

(Evaluation of Laminated Glass)

| Breaking stress | Example a2-1 (Non-processed) | Example a2-2 (With scratching) | Strength difference due to scratching | Reduction percentage in strength due to scratching |
|---|---|---|---|---|
| Overall average [Mpa] | 289 | 202 | Δ 87 | 30.1% |
| Top 20% average [Mpa] | 532 | 403 | Δ 129 | 24.2% |
| Bottom 10% average [Mpa] | 108 | 100 | Δ 8 | 7.4% |

From Table 2 and FIGS. 12 and 13, it was found that the variation in in-plane strength was suppressed, that is, the uniformity of strength was enhanced, in the laminated glass obtained by using the glass plates in which the conveying unit-facing surfaces were scratched. In addition, it was also found that the extent of reduction in the average strength as a whole and the extent of reduction in the strength of the low-strength region in the strength distribution were small, and that the toughness of the laminated glass as an automobile window glass was also maintained.

Experiment b: Scratching during Cleansing

[Experiment b1. Strength Test of Flat Glass Plate]

Example b1-1

In the same manner as in a typical mass production process, the ribbon-shaped glass plate formed by the float method was cut into individual glass plates, cut into a windshield shape, chamfered, and cleansed to obtain a flat non-processed glass plate (unscratched glass plate) having a 2 mm thickness before bend forming.

Example b1-2

After the flat unscratched glass plate obtained in Example b1-1 was sufficiently dried, the upward-facing surface of the unscratched glass plate (the surface opposite to the conveying unit-facing surface) was uniformly coated with a cerium-oxide-containing aqueous liquid abrasive agent (“Kiirobin” manufactured by Prostaff Co., Ltd.) at a rate of 100 g per square meter, uniformly polished with an electric grinder (“Double Action Sander 28457” manufactured by 3M Co., Ltd.) equipped with a resin-made sheet (“TriZact Film 268XA-A5” manufactured by 3M Co., Ltd.) for 15 minutes per sheet, cleansing with water, thereby completing the scratching process. As a result, a flat scratched glass plate, having a 2 mm thickness before bend forming, was obtained.

The glass plates of Example b1-1

(Comparative Example) and Example b1-2 (Example) were Each Evaluated as Follows

<Measurement of Strength (Breaking Stress)>

In each example, a quantity of 50 glass plate samples, each being 66 mm×66 mm in size and 2 mm thick, were cut from one glass plate, and the strength of each glass plate sample was measured as breaking stress (MPa). The breaking stress was measured by R30 in accordance with ISO 1288-5:2016. More specifically, using a 60 mm diameter support ring and a 12 mm diameter load ring, the load was applied by the load ring at a load rate of 0.3 mm per minute to measure the breaking load. In the case of both Example b1-1 and Example b1-2, the load ring was disposed on the side of the conveying unit-facing surface at the timing of conveyance of the glass plates, and the load was applied from the side of the conveying unit-facing surface. Furthermore, breaking stresses were determined using the mathematical expression described in ISO 1288-5:2016.

<Evaluation of Strength Uniformity>

Figure 14:
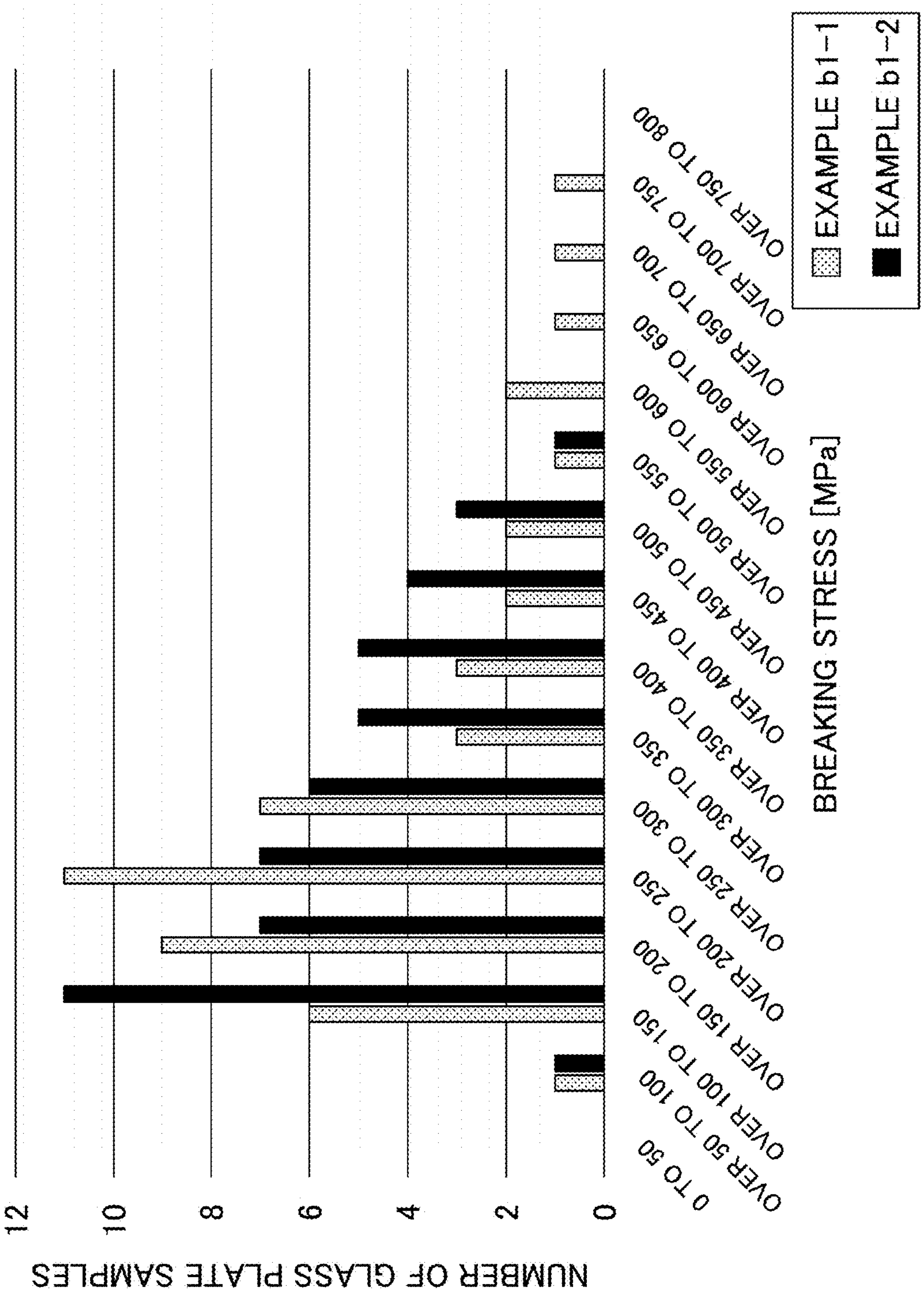
FIG. 14 is a diagram illustrating frequency distributions of strengths of Example b1-1 and Example b1-2.

The pieces of strength data for the aforementioned 50 glass plate samples were used to determine the frequency for every 50 MPa range. FIG. 14 illustrates the respective frequency distributions of Example b1-1 and Example b1-2.

Further, based on the pieces of strength data of the glass plate samples, the pieces of strength data of the top 20% (10 pieces) of the strength distribution were extracted for Example b1-1 in which the scratching process was not performed, and the average value ($S_{1\text{-}1U20}$) was determined. Likewise, in Example b1-2, in which the scratching process was performed, pieces of strength data of the top 20% (10 pieces) of the strength distribution were extracted, and the average value ($S_{1\text{-}2U20}$) was determined. Then, an strength difference due to the scratching, i.e., a value ($S_{1\text{-}1U20}$-$S_{1\text{-}2U20}$) obtained by subtracting the top 20% average value ($S_{1\text{-}2U20}$) of the strength distribution of Example b1-2 from the top 20% average value ($S_{1\text{-}1U20}$) of the strength distribution of Example b1-1, was determined. Furthermore, the reduction percentage in strength due to the scratching was also determined from $\{(S_{1\text{-}1U20}\text{-}S_{1\text{-}2U20})/(S_{1\text{-}1U20})\}\times 100$ (%). The results are illustrated in Table 3 and FIG. 16.

<Evaluation of Toughness>

Likewise, based on the pieces of strength data of the 50 glass plate samples, the pieces of strength data of the bottom 10% (5 pieces) of the strength distribution were extracted for Example b1-1 in which the scratching process was not performed, and the average value ($S_{1\text{-}1L10}$) was determined. For Example b1-2 in which the scratching was performed, the pieces of strength data of the bottom 10% (5 pieces) of the strength distribution were extracted, and the average value ($S_{1\text{-}2L10}$) was determined. Then, a strength difference due to the scratching, i.e., a value ($S_{1\text{-}1L10}$-$S_{1\text{-}2L10}$) obtained by subtracting the bottom 10% average value ($S_{1\text{-}2L10}$) of the strength distribution of Example b1-2 from the bottom 10% average value ($S_{1\text{-}1L10}$) of the strength distribution of Example b1-1, was determined. Furthermore, the reduction percentage in strength due to the scratching was also determined from $\{(S_{1\text{-}1L10}\text{-}S_{1\text{-}2L10})/(S_{1\text{-}1L10})\}\times 100$(%). The results are illustrated in Table 3 and FIG. 16.

TABLE 3

| (Evaluation of Single Glass Plate) | | | | |
|---|---|---|---|---|
| Breaking stress | Example b1-1 (Non-processed) | Example b1-2 (With scratching) | Strength difference due to scratching | Reduction percentage in strength due to scratching |
| Overall average [Mpa] | 288 | 260 | Δ 28 | 9.7% |
| Top 20% average [Mpa] | 553 | 445 | Δ 108 | 19.5% |
| Bottom 10% average [Mpa] | 112 | 104 | Δ 18 | 16.1% |

Figure 16:
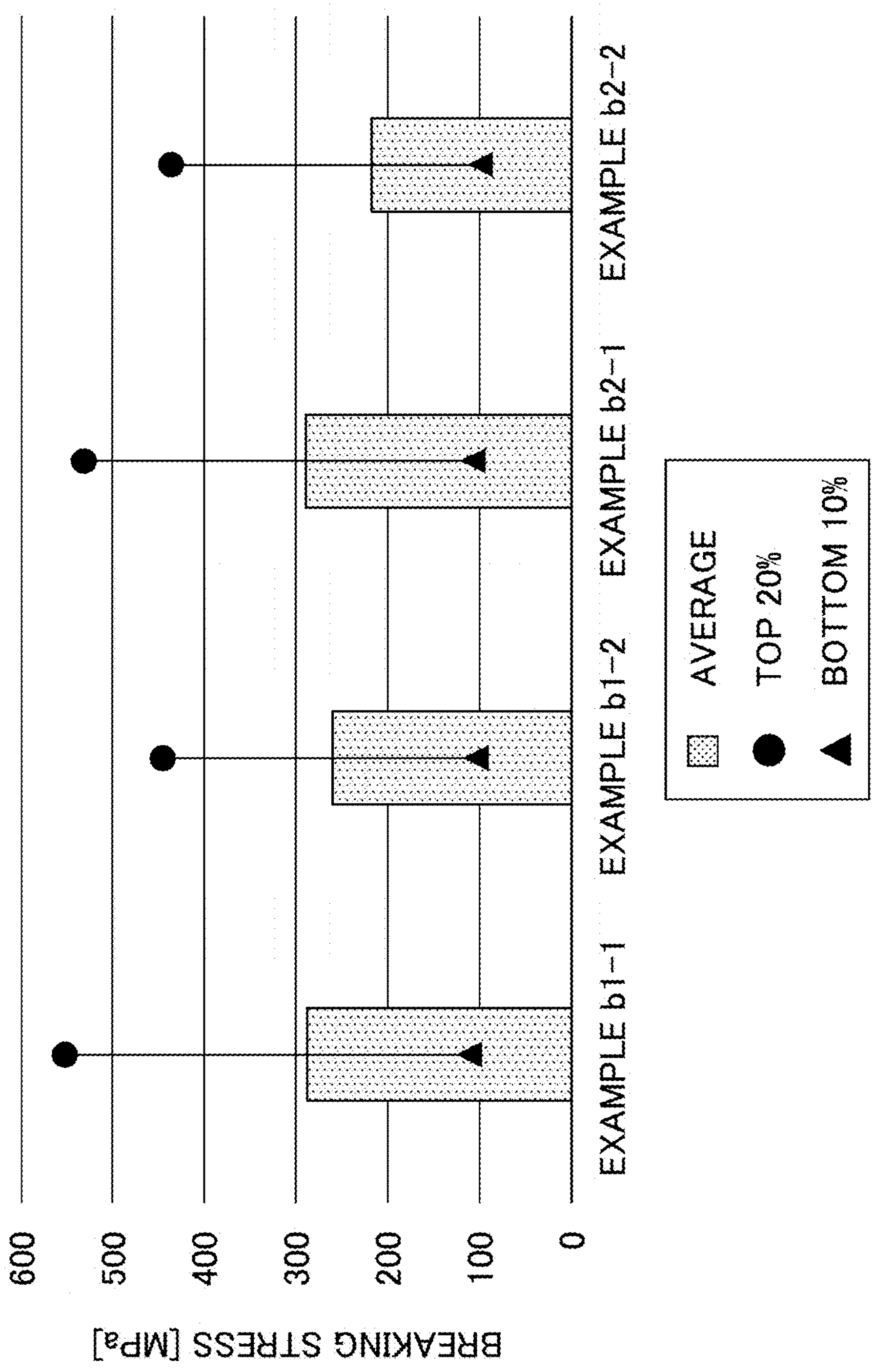
FIG. 16 is a graph illustrating the results of Experiment b.

From Table 3 and FIGS. 14 and 16, it was found that the variation in the in-plane strength was suppressed, that is, the uniformity of the strength was enhanced, in the glass plate (Example b1-2) in which the conveying unit-facing surface was scratched. In addition, it was also found that the extent of the reduction in the average strength as a whole and the extent of reduction in the strength in the low-strength region in the strength distribution were small, and that the toughness of the glass plate was also maintained.

[Experiment b2. Strength Test of Laminated Glass]

Example b2-1

The 2 mm thick non-processed flat glass plates (unscratched glass plates) obtained in Example b1-1 were each bend formed in the same manner as in the typical mass production process, and two the non-processed glass plates were laminated via an interlayer film (PVB-resin) and pressure-bonded to obtain laminated glass (windshield) without undergoing the scratching process. The windshield obtained was a curved laminated glass in which a 2 mm thick glass plate, a 0.76 mm thick interlayer film made of PVB, and a 2 mm thick glass plate were laminated.

Example b2-2

In the series of steps for producing the laminated glass (windshield) in Example b2-1, two sheets of the scratched glass plate produced in Example b1-2 were used instead of the non-processed glass plates (unscratched glass plates) to obtain a scratched laminated glass. When the two scratched glass plates produced in Example b1-2 were laminated, the scratched surfaces (the surfaces on the sides opposite to the conveying unit-facing surfaces) of the glass plates were both arranged so as to be on the vehicle-interior side.

The laminated glass of Example b2-1 (Comparative Example) and the laminated glass of Example b2-2 (Example) were each evaluated as follows.

<Measurement of Strength (Breaking Stress)>

In each example, a quantity of 50 glass plate samples, each being 100 mm×100 mm in size were cut from one laminated glass and the strength of each glass plate sample was measured as the breaking stress (MPa). The breaking stress was measured by R30 in accordance with ISO 1288-5:2016. More specifically, using a 60 mm diameter support ring and a 12 mm diameter load ring, a load was applied by the load ring at a load rate of 1 mm per minute to measure the breaking load. In the case of both Example b2-1 and Example b2-2, the load was applied from the vehicle-exterior side surface of the vehicle-exterior side glass plate (the first surface 11 which is the surface on the vehicle-exterior side of the vehicle-exterior side glass plate 10 in FIG. 2). The breaking stresses were calculated by determining the load-stress relationship using a strain gauge (Kyowa Electronic Instruments Co., Ltd; KFGS-5-120-D17-11) on two glass plate samples.

<Evaluation of Strength Uniformity>

Figure 15:
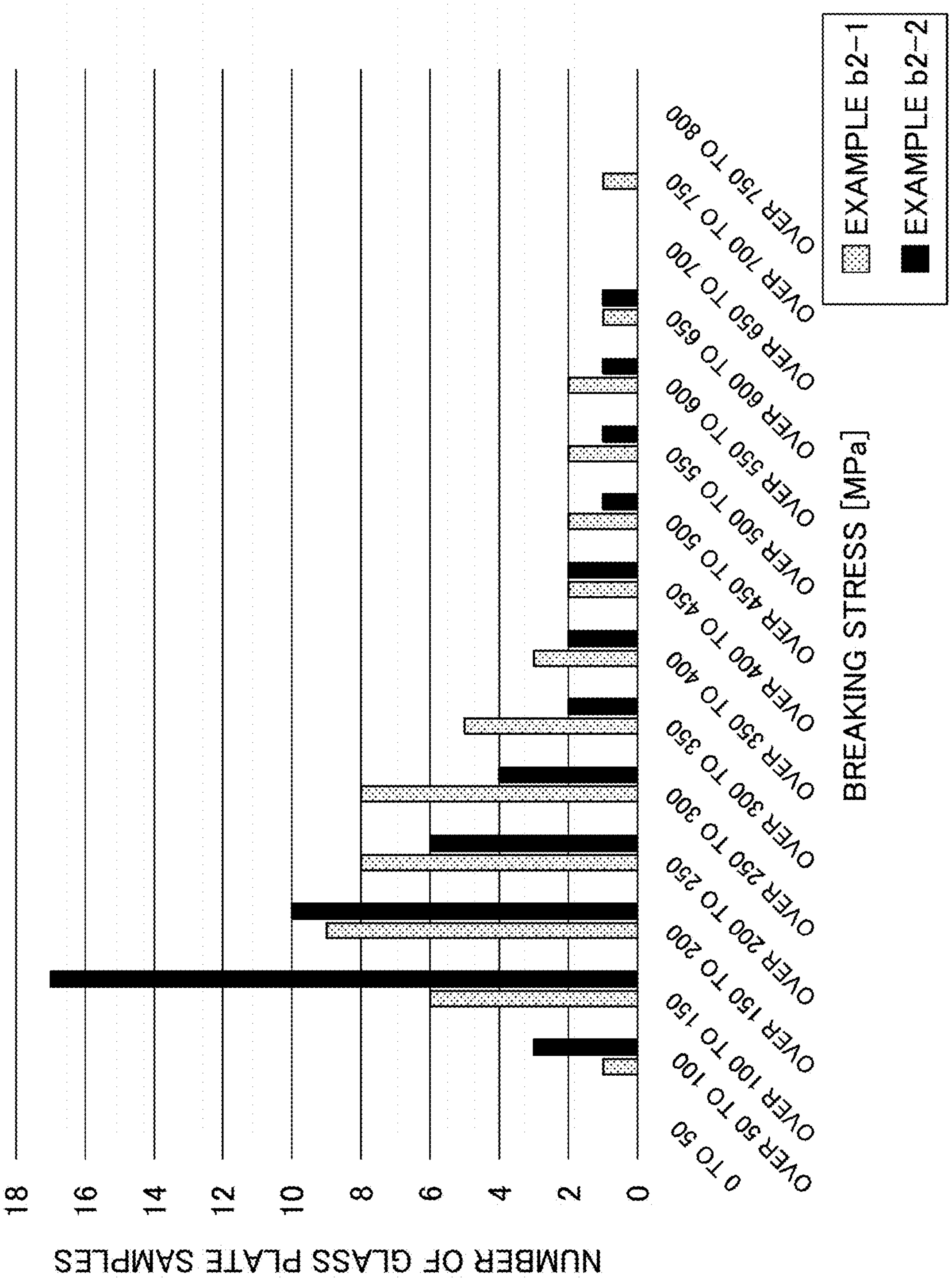
FIG. 15 is a diagram illustrating frequency distributions of strengths of Example b2-1 and Example b2-2.

The pieces of strength data for the aforementioned 50 glass plate samples were used to determine the frequency for every 50 MPa range. FIG. 15 illustrates the respective frequency distributions of Example b2-1 and Example b2-2.

Further, based on the pieces of strength data of the glass plate samples, the pieces of strength data of the top 20% (10 pieces) of the strength distribution were extracted for Example b2-1, which is the non-processed laminated glass, and the average value ($S_{2\text{-}1U20}$) was determined. Likewise, in Example b2-2 which is laminated glass obtained by using scratched glass plates, strength values of the top 20% (10 pieces) of the strength distribution were extracted, and the average value ($S_{2\text{-}2U20}$) was determined. Then, a strength difference due to the scratching, i.e., a value ($S_{2\text{-}1U20}$-$S_{2\text{-}2U20}$) obtained by subtracting the top 20% average value ($S_{2\text{-}2U20}$) of the strength distribution of Example b2-2 from the top 20% average value ($S_{2\text{-}1U20}$) of the strength distribution of Example b2-1, was determined. Furthermore, the reduction percentage in strength due to the scratching was also determined from $\{(S_{2\text{-}1U20}-S_{2\text{-}2U20})/(S_{2\text{-}1U20})\}\times 100$ (%). The results are illustrated in Table 4 and FIG. 16.

<Evaluation of Toughness>

Likewise, based on the pieces of strength data of the 50 glass plate samples, the pieces of strength data of the bottom 10% (5 pieces) of the strength distribution were extracted for Example b2-1, which is the non-processed laminated glass, and the average value ($S_{2\text{-}1L10}$) was determined. For Example b2-2, which is the laminated glass obtained by using the scratched glass plates, the pieces of strength data of the bottom 10% (5 pieces) of the strength distribution were extracted, and the average value ($S_{2\text{-}2L10}$) was determined. Then, a strength difference due to the scratching, i.e., a value ($S_{2\text{-}1L10}$-$S_{2\text{-}2L10}$) obtained by subtracting the bottom 10% average value ($S_{2\text{-}2L10}$) of the strength distribution of Example b2-2 from the bottom 10% average value ($S_{2\text{-}1L10}$) of the strength distribution of Example b2-1, was determined. Furthermore, the reduction percentage in strength due to the scratching was also determined from $\{(S_{2\text{-}1L10}-S_{2\text{-}2L10})/(S_{2\text{-}1L10})\}\times 100$(%). The results are illustrated in Table 4 and FIG. 16.

TABLE 4

(Evaluation of Laminated Glass)

| Breaking stress | Example b2-1 (Non-processed) | Example b2-2 (With scratching) | Strength difference due to scratching | Reduction percentage in strength due to scratching |
|---|---|---|---|---|
| Overall average [Mpa] | 289 | 218 | Δ 71 | 24.6% |
| Top 20% average [Mpa] | 532 | 436 | Δ 96 | 18.0% |
| Bottom 10% average [Mpa] | 108 | 100 | Δ 8 | 7.4% |

From Table 4 and FIGS. 15 and 16, it was found that the variation in in-plane strength was suppressed, that is, the uniformity of strength was enhanced, in the laminated glass obtained by using the glass plates in which the surfaces (non-facing surfaces) on the sides opposite to conveying unit-facing surfaces at the time of conveyance were scratched. In addition, it was also found that the extent of the reduction in the average strength as a whole and the extent of reduction in the strength of the low-strength region in the strength distribution were small, and that the toughness of the laminated glass as an automobile window glass was also maintained.

Experiment c: Scratching with Sandpaper

Example c1

In the same manner as in a typical mass production process, the ribbon-shaped glass plate formed by the float method was cut into individual glass plates, cut into a windshield shape, chamfered, and cleansed to obtain a flat non-processed glass plate (unscratched glass plate) having a 2 mm thickness before bend forming.

Example c2

After the flat unscratched glass plate obtained in Example c1 was sufficiently dried, the upward-facing surface of the unscratched glass plate was placed on a flat table, and then a downward-facing rough surface of #600 sandpaper was placed on the upward-facing surface of the unscratched glass plate. In addition, a roller was rolled once in one direction over the sandpaper along the entire sandpaper area with a load 2 kg applied thereto. At this time, the sandpaper was not moved relative to the surface of the glass plate. As a result, a flat scratched glass plate having a 2 mm thickness before bend forming was obtained.

Example c3

Scratching was performed in the same manner as in Example c2 except that the grit number of the sandpaper used was changed to #2,000.

Example c4

Scratching was performed in the same manner as in Example c2 except that the grit number of the sandpaper used was changed to #8,000.

Example c5

The scratched glass plate obtained in Example c2 was stored under room temperature conditions (25° C., 60% RH) for approximately 90 days.

Example c6

The scratched glass plate obtained in Example c2 was stored under humid conditions (50° C., 95% RH) for 1,000 hours (approximately 41 days).

Example c7

The scratched glass plate obtained in Example c6 was heated in a heating furnace at a maximum reached temperature of 630° C. for 10 minutes.

The glass plates of Example c1 (Comparative Example) and Examples c2 to c7 (Examples) were each evaluated as follows.

<Measurement of Strength (Breaking Stress)>

In each example, a quantity of 50 glass plate samples, each being 66 mm×66 mm in size and 2 mm thick, were cut from one glass plate, and the strength of each glass plate sample was measured as breaking stress (MPa). The breaking stress was measured by R30 in accordance with ISO 1288-5:2016. More specifically, using a 60 mm diameter support ring and a 12 mm diameter load ring, the load was applied by the load ring at a load rate of 0.3 mm per minute to measure the breaking load. In the case of both Example b1-1 and Example b1-2, the load ring was disposed on the side of the conveying unit-facing surface at the timing of conveyance of the glass plates, and the load was applied from the side of the conveying unit-facing surface. Furthermore, breaking stresses were determined using the mathematical expression described in ISO 1288-5:2016.

<Evaluation of Strength Uniformity and Toughness>

The pieces of strength data for the aforementioned 50 glass plate samples were used to determine the average value, the highest value, and lowest value of breaking stress for each of the examples. The results of Example c1 to Example c4 are illustrated in FIG. 17, and the results of Examples c2 and c5 to c7 are illustrated in FIG. 18.

Figure 17:
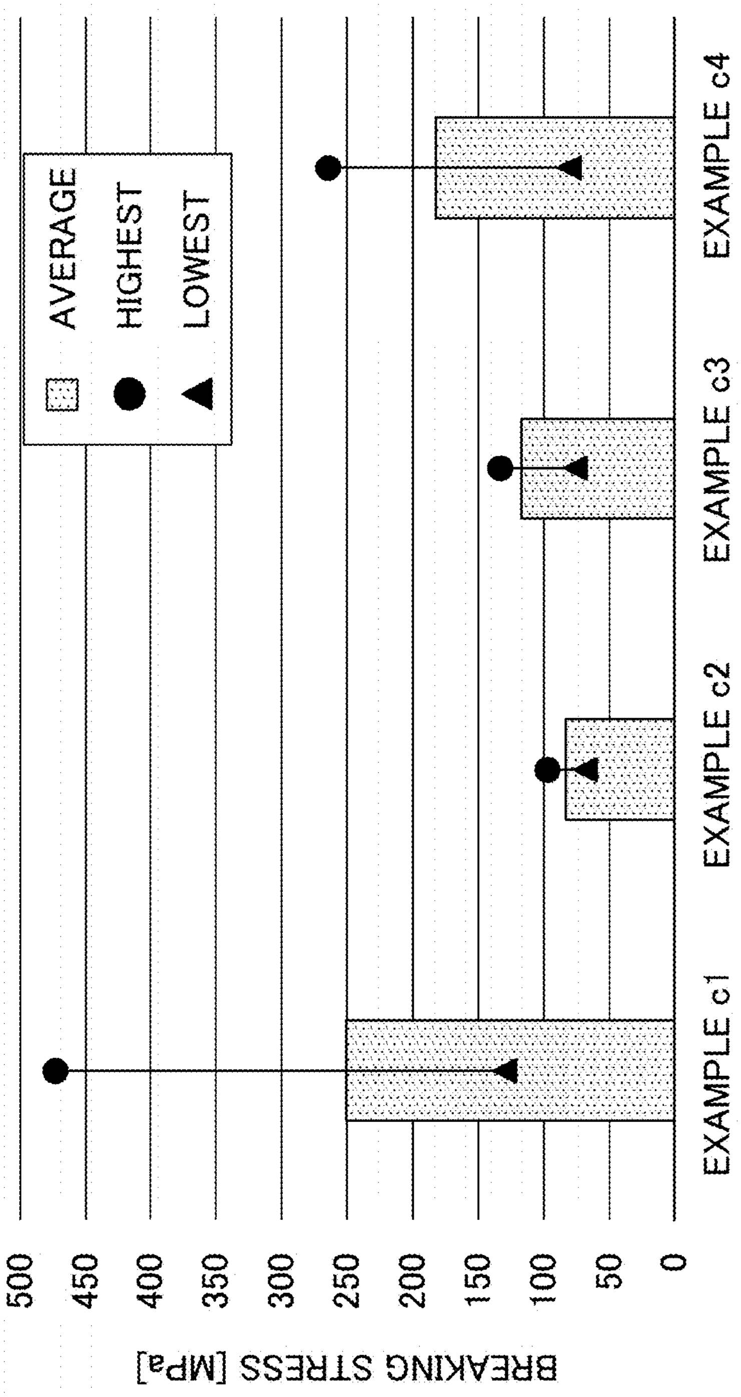
FIG. 17 is a graph illustrating the results of Experiment c.

From FIG. 17, the difference between the highest value and the lowest value was smaller in the glass plates (Example c2 to Example c4) subjected to scratching using sandpaper than in the glass plate (Example c1) not subjected to scratching. Therefore, it was found that the variation in the in-plane strength was suppressed by the scratching, that is, the uniformity of the strength was enhanced. In addition, in the glass plates (Example c2 to Example c4) to which scratching was performed using sandpaper, the lowest value did not decrease so much compared to the glass plate (Example c1) to which scratching was not performed. Therefore, it was also found that the toughness of the glass plate was maintained even when the glass plate was scratched. Further, in the range of the grit numbers of the sandpaper used above, the highest value can be lowered the lower the grit number is, and thus it was found that the strength uniformity can be easily adjusted by changing the grit number of the sandpaper.

Figure 18:
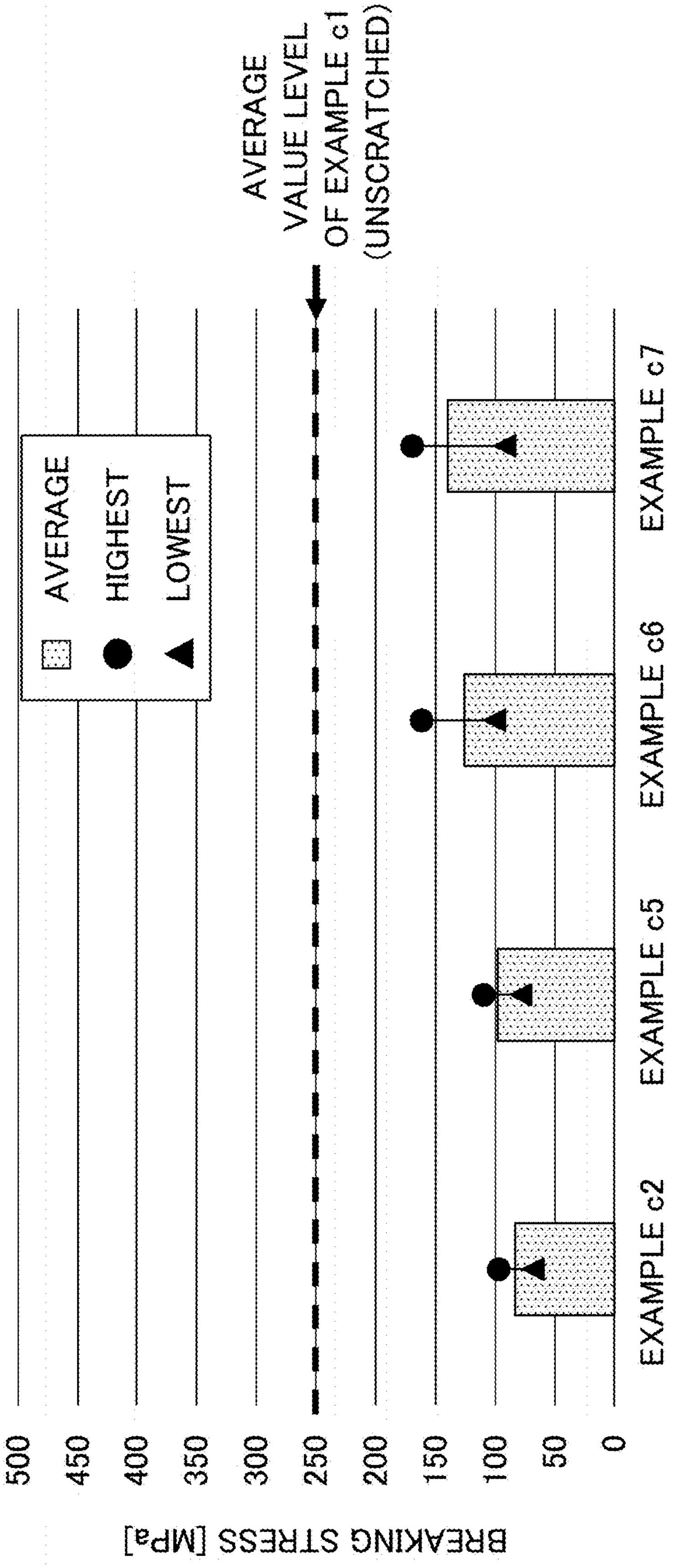
FIG. 18 is a graph illustrating the results of Experiment c.

From FIG. 18, it was found that even when stored for a predetermined time or longer or when heated (Example c5 to Example c7), the breaking stresses had sufficiently low values compared to the average value of the breaking stresses of the unscratched glass plate (Example c1), and that the effect of scratching was sufficiently maintained. Further, from the comparison between the result of the glass plate (Example c5) after storage at room temperature and the result of the glass plate (Example c2) before storage and the comparison between the result of the glass plate (Example c6) after the storage under humid conditions and the result of the glass plate (Example c2) before the storage, it was found that the effect of scratching is sufficiently maintained when the scratched glass plate is stored for a long period of time. In addition, from a comparison between the results of the glass plate before heating (Example c6) and the results of the glass plate after heating (Example c7), it was found that there was no remarkable change even when the glass plate was heated under conditions corresponding to the heating conditions of a bending oven, and that the effect of scratching was maintained to some extent.

Specific embodiments are additionally described below.

[Supplementary note a1]

A method for producing laminated glass for automobile windows, the method including:

heating and bend forming two glass plates; and bonding together the two bend-formed glass plates via an interlayer film, wherein before the heating and bend forming of the two glass plates, at least one glass plate of the two glass plates that are flat, is conveyed by a conveying unit while either a conveying unit-facing surface of the at least one glass plate or a non-facing surface of the at least one glass plate that is opposite to the conveying unit-facing surface is scratched by the conveying unit, and in the bonding together of the two bend-formed glass plates via the interlayer film, the scratched surface is disposed such that the scratched surface is situated on a vehicle-interior side upon the laminated glass for automobile windows being attached to an automobile.

[Supplementary note a2]

The method for producing laminated glass for automobile windows according to supplementary note a1, wherein the conveying unit-facing surface of each of the two glass plates that are flat is scratched.

[Supplementary note a3]

The method for producing laminated glass for automobile windows according to supplementary note a1 or supplementary note a2, wherein the scratching is performed such that a difference between an average of a top 20% of a strength distribution of the conveying unit-facing surface before the scratching and an average of a top 20% of a strength distribution of the conveying unit-facing surface after the scratching is 50 MPa or more, and a difference between an average of a bottom 10% of the strength distribution of the conveying unit-facing surface before the scratching and an average of a bottom 10% of the strength distribution of the conveying unit-facing surface after the scratching is 50 MPa or less, and the strength is a breaking stress measured by a method described in ISO 1288-5:2016 by applying a load from a side opposite to the conveying unit-facing surface.

[Supplementary note a4]

The method for producing laminated glass for automobile windows according to any one of supplementary notes a1 to a3, wherein a reduction percentage of an average value of a top 20% of a strength distribution of the conveying unit-facing surface due to the scratching is 10% or more, and a reduction percentage of an average value of a bottom 10% of the strength distribution of the conveying unit-facing surface due to the scratching is 20% or less.

[Supplementary note a5]

The method for producing laminated glass for automobile windows according to any one of supplementary notes a1 to a4, wherein the conveying unit includes a plurality of conveying rollers, and at least one of the conveying rollers has a rough surface.

[Supplementary note a6]

The method for producing laminated glass for automobile windows according to any one of supplementary notes a1 to a5, wherein the conveying unit includes a plurality of conveying rollers, and an angular velocity, a diameter, a height, or any combination thereof of the at least one conveying roller is different from that of a conveying roller adjacent to the at least one conveying roller.

[Supplementary note a7]

Laminated glass for automobile windows that is obtained by bonding together a vehicle-exterior side glass plate and a vehicle-interior side glass plate via an interlayer film, the laminated glass for automobile windows, wherein the vehicle-exterior side glass plate has a first surface on a vehicle-exterior side and a second surface on a vehicle-interior side, the vehicle-interior side glass plate has a third surface on a vehicle-exterior side and a fourth surface on a vehicle-interior side, and one or more of Condition 1 to Condition 3 as follows is satisfied, Condition 1 being a condition in which a difference between an average value of a top 20% of a strength distribution of the first surface and an average value of a top 20% of a strength distribution of the fourth surface is 50 MPa or more, and a difference between an average value of a bottom 10% of the strength distribution of the first surface and an average value of a bottom 10% of the strength distribution of the fourth surface is 50 MPa or less, where the strength is defined as a breaking stress measured by a method in accordance with ISO 1288-5:2016, Condition 2 being a condition in which a difference between the average value of the top 20% of the strength distribution of the first surface and an average value of a top 20% of a strength distribution of a second surface is 50 MPa or more, and a difference between the average value of the bottom 10% of the strength distribution of the first surface and an average value of a bottom 10% of the strength distribution of the second surface is 50 MPa or less, where the strength is defined as the breaking stress measured by the method in accordance with ISO 1288-5:2016, and Condition 3 being a condition in which a difference between an average value of a top 20% of a strength distribution of the third surface and the average value of the top 20% of the strength distribution of the fourth surface is 50 MPa or more, and a difference between an average value of a bottom 10% of the strength distribution of the third surface and the average value of the bottom 10% of the strength distribution of the fourth surface is MPa or less, where the strength is defined as the breaking stress measured by the method in accordance with ISO 1288-5:2016.

[Supplementary note a8]

The laminated glass for automobile windows that is obtained by bonding together the vehicle-exterior side glass plate and the vehicle-interior side glass plate via the interlayer film according to supplementary note a7, wherein an average value of a top 20% of a breaking stress distribution of a transmittance region measured by a method in accordance with ISO 1288-5:2016 by applying a load from a vehicle-exterior side is 500 MPa or less.

[Supplementary note a9]

The laminated glass for automobile windows according to supplementary note a7 or supplementary note a8, wherein the laminated glass for automobile windows is a windshield.

[Supplementary note a10]

An automobile equipped with the laminated glass for automobile windows of any one of supplementary notes a7 to a9.

[Supplementary note b1]

A method for producing laminated glass for automobile windows, the method including:

heating and bend forming two glass plates; and bonding together the two bend-formed glass plates via an interlayer film, wherein before the heating and bend forming of the two glass plates, at least one glass plate of the two glass plates that are flat, is conveyed by a conveying unit while either a conveying unit-facing surface of the at least one glass plate or a non-facing surface of the at least one glass plate that is opposite to the conveying unit-facing surface is scratched by the conveying unit, and in the bonding together of the two bend-formed glass plates via the interlayer film, the scratched surface is disposed such that the scratched surface is situated on a vehicle-interior side upon the laminated glass for automobile windows being attached to an automobile.

[Supplementary note b2]

The method for producing laminated glass for automobile windows according to supplementary note b1, wherein each of the non-facing surfaces of the two glass plates that are flat is scratched.

[Supplementary note b3]

The method for producing laminated glass for automobile windows according to supplementary note b1 or supplementary note b2, wherein scratching is performed such that a difference between an average of a top 20% of a strength distribution of the conveying unit-facing surface and an average of a top 20% of a strength distribution of the non-facing surface is MPa or more, and a difference between an average of a bottom 10% of the strength distribution of the conveying unit-facing surface and an average of a bottom 10% of the strength distribution of the non-facing surface is 50 MPA or less, where the strength is a breaking stress measured by a method described in ISO 1288-5:2016 by applying a load from the non-facing surface.

[Supplementary note b4]

The method for producing laminated glass for automobile windows according to any one of supplementary notes b1 to b3, wherein reduction percentage of an average value of a top 20% of a strength distribution of the non-facing surface due to the scratching is 10% or more, and a reduction percentage of an average value of a bottom 10% of the strength distribution of the non-facing surface due to the scratching is 20% or less.

[Supplementary note b5]

The method for producing laminated glass for automobile windows according to any one of supplementary notes b1 to b4, wherein the scratching is performed by bringing a scratching tool into contact with the non-facing surface and moving the scratching tool relative to the non-facing surface.

[Supplementary note b6]

The method for producing laminated glass for automobile windows according to supplementary note b5, wherein the scratching is performed in presence of an abrasive agent.

[Supplementary note b7]

The method for producing laminated glass for automobile windows according to supplementary note b5 or supplementary note b6, wherein water or an aqueous liquid is interposed between the scratching tool and the non-facing surface.

[Supplementary note b8]

Laminated glass for automobile windows that is obtained by bonding together a vehicle-exterior side glass plate and a vehicle-interior side glass plate via an interlayer film, the laminated glass for automobile windows, wherein the vehicle-exterior side glass plate has a first surface on a vehicle-exterior side and a second surface on a vehicle-interior side, the vehicle-interior side glass plate has a third surface on a vehicle-exterior side and a fourth surface on a vehicle-interior side, and one or more of Condition 1 to Condition 3 as follows is satisfied, Condition 1 being a condition in which a difference between an average value of a top 20% of a strength distribution of the first surface and an average value of a top 20% of a strength distribution of the fourth surface is 50 MPa or more, and a difference between an average value of a bottom 10% of the strength distribution of the first surface and an average value of a bottom 10% of the strength distribution of the fourth surface is 50 MPa or less, where the strength is defined as a breaking stress measured by a method in accordance with ISO 1288-5:2016, Condition 2 being a condition in which a difference between the average value of the top 20% of the strength distribution of the first surface and an average value of a top 20% of a strength distribution of a second surface is 50 MPa or more, and a difference between the average value of the bottom 10% of the strength distribution of the first surface and an average value of a bottom 10% of the strength distribution of the second surface is 50 MPa or less, where the strength is defined as the breaking stress measured by the method in accordance with ISO 1288-5:2016, and Condition 3 being a condition in which a difference between an average value of a top 20% of a strength distribution of the third surface and the average value of the top 20% of the strength distribution of the fourth surface is 50 MPa or more, and a difference between an average value of a bottom 10% of the strength distribution of the third surface and the average value of the bottom 10% of the strength distribution of the fourth surface is MPa or less, where the strength is defined as the breaking stress measured by the method in accordance with ISO 1288-5:2016.

[Supplementary note b9]

The laminated glass for automobile windows according to supplementary note b8, wherein average value of a top 20% of a breaking stress distribution of a transmittance region measured by a method in accordance with ISO 1288-5:2016 by applying a load from a vehicle-exterior side is 500 MPa or less.

[Supplementary note b10]

The laminated glass for automobile windows according to supplementary note b8 or supplementary note b9, wherein the laminated glass for automobiles is a windshield.

[Supplementary note b11]

An automobile equipped with the laminated glass for automobile windows of any one of Supplementary notes b8 to b10.

The method for producing laminated glass for automobile windows, the laminated glass for automobile windows, and the automobile, are not limited to the specific embodiments described in the detailed description, and variations and modifications may be made without departing from the spirit and scope of the present invention.

What is claimed is:

1. A laminated glass for automobile windows that is obtained by bonding together a vehicle-exterior side glass plate and a vehicle-interior side glass plate via an interlayer film, the laminated glass for automobile windows, wherein the vehicle-exterior side glass plate has a first surface on a vehicle-exterior side and a second surface on a vehicle-interior side, the vehicle-interior side glass plate has a third surface on a vehicle-exterior side and a fourth surface on a vehicle-interior side, at least one of the second surface and the fourth surface has microcracks that suppress in a variation of an in-plane strength of the glass, and one or more of Condition 1 to Condition 3 as follows is satisfied, Condition 1 being a condition in which a difference between an average value of a top 20% of a strength distribution of the first surface and an average value of a top 20% of a strength distribution of the fourth surface is 50 MPa or more, and a difference between an average value of a bottom 10% of the strength distribution of the first surface and an average value of a bottom 10% of the strength distribution of the fourth surface is 50 MPa or less, where the strength is defined as a breaking stress measured by a method in accordance with ISO 1288-5:2016, Condition 2 being a condition in which a difference between the average value of the top 20% of the strength distribution of the first surface and an average value of a top 20% of a strength distribution of a second surface is 50 MPa or more, and a difference between the average value of the bottom 10% of the strength distribution of the first surface and an average value of a bottom 10% of the strength distribution of the second surface is 50 MPa or less, where the strength is defined as the breaking stress measured by the method in accordance with ISO 1288-5:2016, and Condition 3 being a condition in which a difference between an average value of a top 20% of a strength distribution of the third surface and the average value of the top 20% of the strength distribution of the fourth surface is 50 MPa or more, and a difference between an average value of a bottom 10% of the strength distribution of the third surface and the average value of the bottom 10% of the strength distribution of the fourth surface is 50 MPa or less, where the strength is defined as the breaking stress measured by the method in accordance with ISO 1288-5:2016.

2. The laminated glass for automobile windows according to claim 1, obtained by bonding together the vehicle-exterior side glass plate and the vehicle-interior side glass plate via the interlayer film, wherein an average value of a top 20% of a breaking stress distribution of a transmittance region measured by a method in accordance with ISO 1288-5:2016 by applying a load from a vehicle-exterior side is 500 MPa or less.

3. The laminated glass for automobile windows of claim 1, wherein the laminated glass for automobile windows is a windshield.

4. An automobile equipped with the laminated glass for automobile windows of claim 1.

5. The laminated glass for automobile windows of claim 1, a difference between a maximum value and a minimum value in a distribution of the in-plane strength of at least one of the second and fourth surfaces is smaller than a difference between a maximum value and a minimum value in a distribution of an in-plane strength of at least one of the first and third surfaces.

* * * * *